(12) United States Patent
Abdulkhair et al.

(10) Patent No.: US 12,275,881 B1
(45) Date of Patent: *Apr. 15, 2025

(54) METHOD FOR MAKING BISMUTH OXYHALIDE QUANTUM DOTS

(71) Applicant: IMAM MOHAMMAD IBN SAUD ISLAMIC UNIVERSITY, Riyadh (SA)

(72) Inventors: Babiker Y. Abdulkhair, Riyadh (SA); Faisal K. Algethami, Riyadh (SA); Mohamed R. Elamin, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/968,443

(22) Filed: Dec. 4, 2024

Related U.S. Application Data

(63) Continuation of application No. 18/798,885, filed on Aug. 9, 2024, now Pat. No. 12,187,940, which is a continuation of application No. 18/665,855, filed on May 16, 2024, now Pat. No. 12,110,434.

(51) Int. Cl.
  *C09K 11/74* (2006.01)
  *C01G 29/00* (2006.01)

(52) U.S. Cl.
  CPC .......... *C09K 11/7428* (2013.01); *C01G 29/00* (2013.01)

(58) Field of Classification Search
  CPC ............................ C09K 11/7428; C01G 29/00
  See application file for complete search history.

(56) References Cited

U.S. PATENT DOCUMENTS 12,110,434 B1 * 10/2024 Abdulkhair ........ C09K 11/7428
12,187,940 B1 * 1/2025 Abdulkhair ............ C01G 29/00

FOREIGN PATENT DOCUMENTS

| CN | 104817112 B | 4/2016 |
| CN | 106732684 B | 4/2018 |
| CN | 108187698 A | 6/2018 |
| CN | 108722445 | 11/2018 |
| CN | 108855151 | 11/2018 |
| CN | 113649029 | 11/2021 |
| CN | 114515582 A | 5/2022 |
| CN | 116651474 B | 11/2023 |

OTHER PUBLICATIONS

Yin et al. ; Wet Chemically Synthesized Bismuth Oxyiodide (BiOI) Quantum Dots for Photocatalytic Degradation of Malachite Green ; Journal of Nanoscience and Nanotechnology, vol. 18, No. 5 ; May 2018 ; Abstract Only ; 2 Pages.
Yang et al. ; Construction of porous-hydrangea BiOBr/BiOI n-n heterojunction with enhanced photodegradation of tetracycline hydrochloride under visible light ; Journal of Alloys and Compounds, vol. 864 ; May 25, 2021 ; 4 Pages.

* cited by examiner

*Primary Examiner* — C Melissa Koslow
(74) *Attorney, Agent, or Firm* — Oblon, McClelland, Maier & Neustadt, L.L.P.

(57) ABSTRACT

A method of producing bismuth oxyhalide quantum dots without heat. The method is a one-pot method that includes synthesizing bismuth oxyhalide quantum dots at room temperature. The method results in quantum dots preferably having bismuth and halide in a molar ratio of 1:1. Further, the bismuth oxyhalide quantum dots produced demonstrate excellent photocatalytic activity in the visible light spectrum and possess improved surface characteristics.

14 Claims, 21 Drawing Sheets

METHOD FOR MAKING BISMUTH OXYHALIDE QUANTUM DOTS

CROSS-REFERENCE TO RELATED APPLICATIONS

The present application is a Continuation of U.S. application Ser. No. 18/798,885, now U.S. Pat. No. 12,187,940, having a filing date of Aug. 9, 2024, which is a Continuation of U.S. application Ser. No. 18/665,855, now U.S. Pat. No. 12,110,434, having a filing date of May 16, 2024.

BACKGROUND

Technical Field

The present disclosure is directed to quantum dots, particularly quantum dots based on bismuth oxyiodide and their method of synthesis, for use in various nanomaterial-based devices and applications.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Quantum dots (Qds) exhibit extraordinary properties that have drawn the attention of researchers. Semiconductors (SCDs) enhanced the development of everything, including mobile phones, lasers, computers, and satellites. SCDs quantum dots (Qds) provide a further improvement in properties. The confinement of electron mobility to distances of Qds results in an electronic structure that resembles that of atoms and size-dependent energy levels. Because of their vast surface-to-volume ratio, Qds can have highly adjustable light absorption properties, provide rich emission of pure colors, provide control over electronic transport, and allow for fantastic customization of chemical and physical functions. For the sake of maintaining and improving the desired chemical and optoelectronic properties with high repeatability, it is crucial that Qds production techniques continue to evolve. This calls for the development of low-cost synthesis methods and precursors that can scale up the Qds to commercial quantities, so it can be used for large-area applications.

Qds and its confinement effects are an exciting opportunity for the field of quantum information technology, which relies on the transmission of coherent light and electrons. The development of Qds and their synthesis methods enables a growing and thriving field of novel devices and applications. Nanostructuring's significance in toxicity and life cycle assessment is rising; hence, materials that do not rely on heavy metals like Cd, Pb, and Hg deserve additional focus. Bismuth oxyhalides (BiOX) have been shown to have adsorption, photocatalysis, and anticancer activities. Among the BiOX family, bismuth oxyiodide (BiOI) has the lowest bandgap energy, making it a good photocatalyst within the visible light region. BiOI is a p-type-semiconductor with various applications encompassing photocatalysis, sensors, and solar energy. Its use of safe-visible light for degrading organic pollutants in water instead of the carcinogenic UV is one of the most significant advantages.

Researchers still seek simple synthesis routes for this material. BiOI are conventionally synthesized using several solvents, including an ethanol-water mixture, ethylene glycol, and glycerol. These methods generally include thermal treatments, including autoclave incubation, microwave heating, or direct refluxing of high boiling point solvent. Despite the domination of solvothermal methods for preparing BiOI, ionic-layer-sorption, and chemical-based deposition have also bee utilized. Recent studies focused on decreasing energy consumption during fabricating BiOI via short-refluxing time or starting at room temperature followed by autoclave incubation. The synthesis reagents and conditions significantly impact the photocatalyst's crystallinity, size, morphology, and optical activity. Moreover, the preparation pH, incubation temperature, and in-air heating process were investigated and were found to significantly impact the product characteristics. These characteristics created their suitability for various applications, including sensing, imaging, drug transport-release, diagnosis, real-time monitoring, and tracking. Wet-chemical processes were more common for producing colloidal quantum dots because of the ease of controlling solution parameters. Conventional methods use hydro/solvothermal treatment and other time-consuming techniques.

Accordingly, it is an object of the present disclosure to provide quantum dots and a method of making quantum dots, that possess excellent properties and that which can be synthesized by less complicated yet affordable techniques.

SUMMARY

An embodiment of the present disclosure describes a method of making bismuth oxyhalide quantum dots without added heat. The method comprises creating a first solution by dissolving a bismuth salt in an organic solvent; creating a second solution by dissolving an alkali metal salt in water; combining the first solution and the second solution to obtain a dual mixture; pouring the dual mixture into an aqueous surfactant solution comprising a surfactant to obtain a final mixture comprising the bismuth oxyhalide quantum dots; and filtering the final solution to obtain the bismuth oxyhalide quantum dots. The bismuth salt may be $Bi(NO_3)_3$.

In some embodiments, the alkali metal salt is selected from the group consisting of LiI, NaI, KI, RbI, CsI, LiBr, NaBr, KBr, RbBr, CsBr, LiCl, NaCl, KCl, RbCl, $NH_4I$, and CsCl. In some embodiments, the surfactant is a surfactant.

In some embodiments, the dual mixture is added to the surfactant solution such that the ratio of the dual mixture to the surfactant solution is 1:4 wt %.

In some embodiments, the organic solvent is selected from the group consisting of polyethylene glycol, methylene glycol, tri-ethylene glycol, and ethylene glycol. In some embodiments, the surfactant is selected from the group consisting of an octyl phenol ethoxylate, a polyoxyethylene sorbitan monolaurate, or a polyoxyethylene sorbitan monooleate.

In some embodiments, the dual mixture is stirred for 5 to 10 minutes at a temperature of 15 to 25° C.

In some embodiments, the final mixture is stirred for 10 to 15 minutes at a temperature of 15 to 25° C.

In some embodiments, the final solution is filtered by a vacuum.

In some embodiments, the bismuth quantum dots are dried for 2 to 4 hours at a temperature of 100 to 115° C.

In some embodiments, the surfactant in the final mixture is present in an amount between 0.5 to 2.2 wt %.

In some embodiments, the alkali metal salt is KI.

In some embodiments, the bismuth oxyhalide quantum dots have a surface area of 50 to 100 m²/g, preferably a surface area of 55 to 90 m²/g, more preferably 59 to 82 m²/g.

In some embodiments, the bismuth oxyhalide quantum dots have a band gap energy ($E_g$) of 1 to 3 eV, preferably 1.5 to 2.5 eV, more preferably 1.80 to 2 eV.

In some embodiments, the bismuth oxyhalide quantum dots have an average crystal size of 1 to 10 nm.

In some embodiments, the organic solvent is ethylene glycol.

In some embodiments, the surfactant is an octyl phenol ethoxylate.

In some embodiments, the bismuth oxyhalide quantum dots have a Bi:I molar ratio of 1:1.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
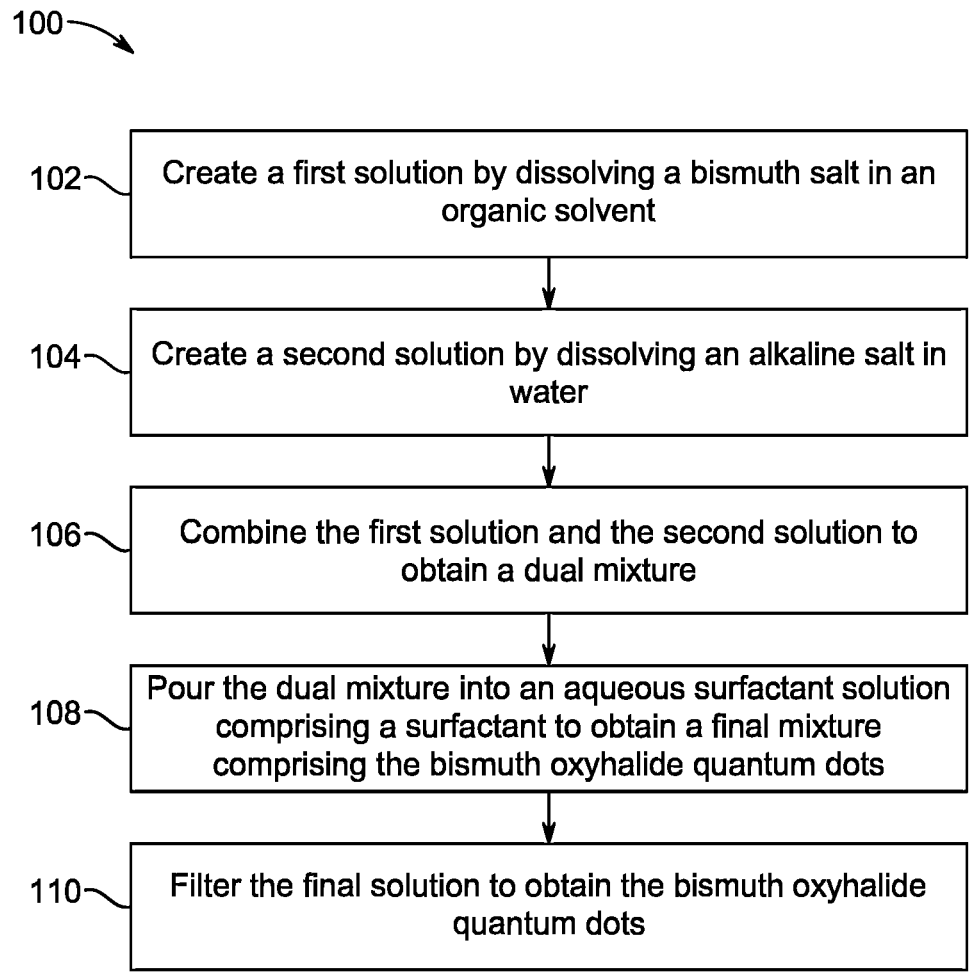
FIG. 1 is a flowchart depicting a method of producing bismuth oxyhalide (BiOX) quantum dots according to certain embodiments.
Figure 2A:
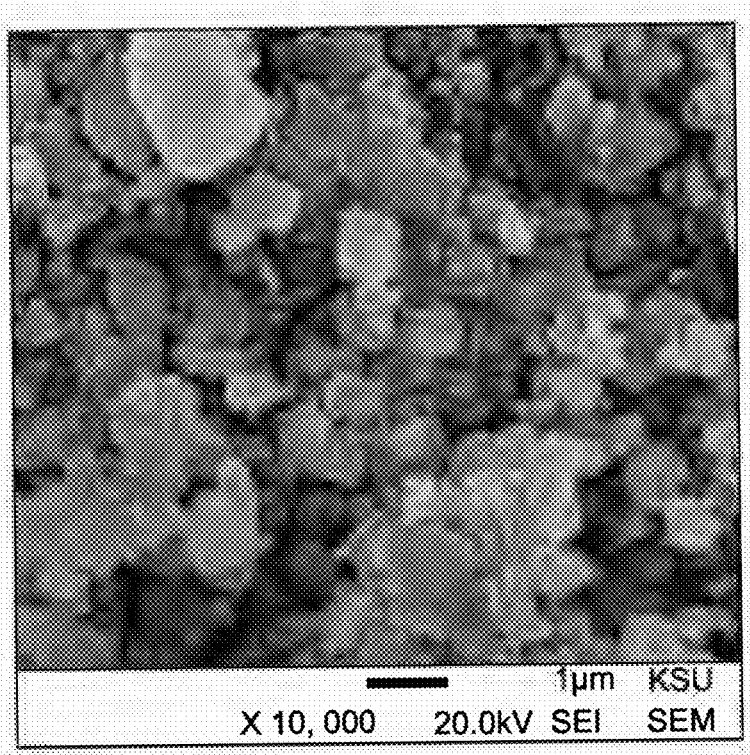
FIG. 2A shows a scanning electron microscope (SEM) overview image of room temperature-fabricated bismuth oxyiodide (BiOI) without a surfactant (designated as BiOI-W), as a comparative example, showing the formation of large lumps.
Figure 2B:
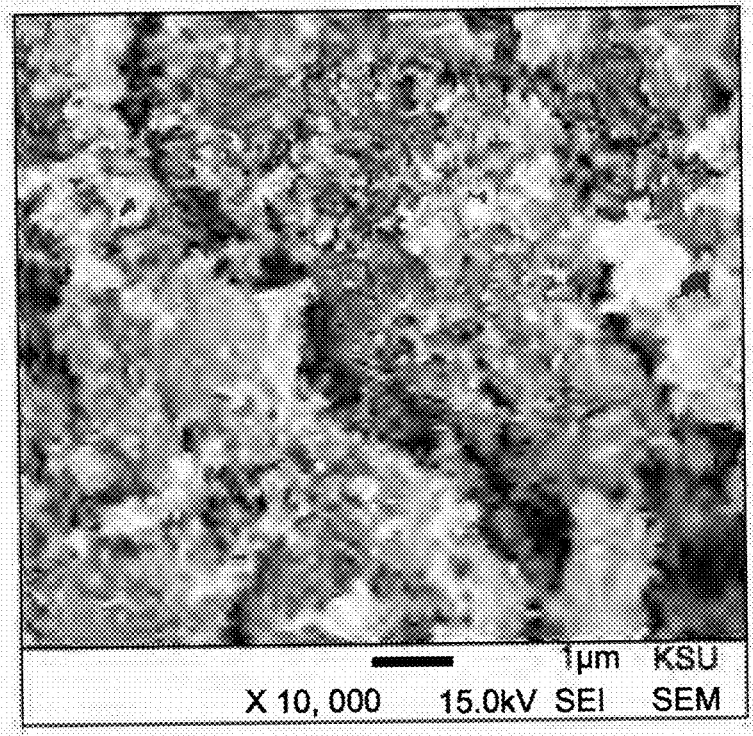
FIG. 2B shows a SEM overview image of room temperature-fabricated BiOI in the presence of a lower amount of surfactant, Tween 20 (T20) (designated as BiOI-T20), as a comparative example, showing the formation of agglomerated nanomaterials.
Figure 2C:
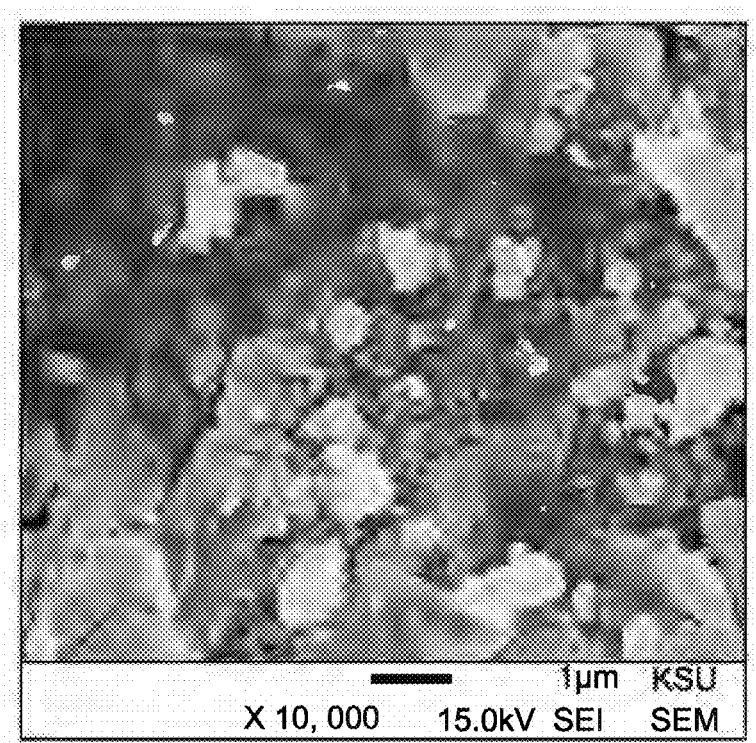
FIG. 2C shows an SEM overview image of room temperature-fabricated BiOI in the presence of a lower amount of surfactant, Tween 80 (T80) (designated as BiOI-T80), as a comparative example, showing the formation of agglomerated nanomaterials.
Figure 2D:
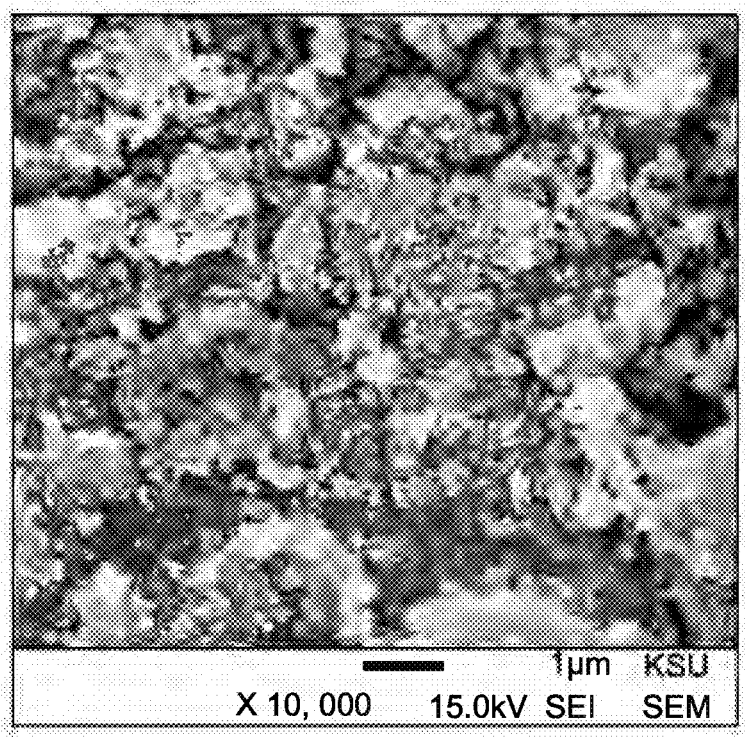
FIG. 2D shows an SEM overview image of room temperature-fabricated BiOI in the presence of a lower amount of surfactant, Triton-X100 (TR) (designated as BiOI-TR), as comparative example, showing the formation of agglomerated nanomaterials.

In the drawings, reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "particle size" may be considered the lengths or longest dimensions of a particle.

As used herein, the term "solution" may be defined as a homogeneous mixture of two more substances.

As used herein, the term "solvent" may be considered as a substance, preferably liquid, that dissolves other substances to form a solution.

As used herein, the term "organic solvent" refers to organic compounds that can dissolve other substances, for example, aromatic compounds such as benzene.

As used herein, the term "surfactant" refers to a compound that lowers the surface tension (or interfacial tension) between two liquids, between a liquid and a gas, or between a liquid and a solid. The surfactant may be a surfactant, an anionic surfactant, a cationic surfactant, a viscoelastic surfactant, or a zwitterionic surfactant. The surfactant may also be a gemini surfactant. The surfactant may serve a role as a water-wetting agent, a defoamer, a foamer, a detergent, a dispersant, or an emulsifier.

As used herein, the term "non-ionic surfactants" refers to surfactant compounds that do not ionize when dissolved in water. They are highly soluble in water and find uses in cleaning preparations such as detergents. surfactants have a polar group that does not have a charge. These include long chain alcohols that exhibit surfactant properties, such as cetyl alcohol, stearyl alcohol, cetostearyl alcohol, oleyl alcohol, and other fatty alcohols. Other long chain alcohols with surfactant properties include polyethylene glycols of various molecular weights, polyethylene glycol alkyl ethers having the formula $CH_3-(CH_2)_{10-16}-(O-C_2H_4)_{1-25}-OH$, such as octaethylene glycol monododecyl ether and pentaethylene glycol monododecyl ether; polypropylene glycol alkyl ethers having the formula: $CH_3-(CH_2)_{10-16}-(O-C_3H_6)_{1-25}-OH$; glucoside alkyl ethers having the formula $CH_3-(CH_2)_{10-16}-(O-glucoside)_{1-3}-OH$, such as decyl glucoside, lauryl glucoside, octyl glucoside; polyethylene glycol octylphenyl ethers having the formula $C_8H_{17}-(C_6H_4)-(O-C_2H_4)_{1-25}-OH$, such as Triton X-100; polyethylene glycol alkylphenyl ethers having the formula $C_9H_{19}-(C_6H_4)-(O-C_2H_4)_{1-25}-OH$, such as nonoxynol-9; glycerol alkyl esters such as glyceryl laurate; polyoxyethylene glycol sorbitan alkyl esters such as polysorbate, sorbitan alkyl esters, cocamide MEA, cocamide DEA, dodecyldimethylamine oxide, block copolymers of polyethylene glycol and polypropylene glycol, such as poloxamers, and polyethoxylated tallow amine (POEA).

In other embodiments, the surfactant may be selected from gum Arabic, sucrose, glucose, and sorbitol.

As used herein, the term "alkali metal salts"

As used herein, the term "weight percent" of a component, unless specifically stated to the contrary, is based on the total weight of the formulation or composition in which the component is included. For example, if a particular element or component in a composition or article is said to have 5 wt %, it is understood that this percentage is in relation to a total compositional percentage of 100%.

As used herein, the term "% w/v" refers to percentage weight by volume and is calculated as the fraction of weight of the solute related to the volume of the solution.

As used herein, the term "nanoparticles" refers to particles whose size ranges between 1 to 100 nm.

As used herein, the term "nanomaterial" refers to materials composed of nanoparticles that find multiple uses in medicine, imaging devices, consumer products, and the like.

As used herein, the term "quantum dots" refers to semiconductor small particles nanometers in size with optical and electronic properties.

As used herein, the term "bandgap energy" or "Eg" refers to the energy required to transfer an electron from the valence band to the conduction band.

Aspects of the present disclosure are directed to the synthesis of quantum dots based on bismuth oxyhalides, particularly bismuth oxyiodide (BiOI)-based Qds without any added heat. A one-pot approach is adopted to prepare the bismuth oxyhalide quantum dots (BiOI Qds) with the help of a surfactant. The BiOI Qds prepared by the method of present disclosure demonstrated a significant improvement in surface characteristics compared to the BiOI Qds prepared by conventional methods and/or prepared in the absence of a surfactant.

Referring to FIG. 1, a method 100 of producing bismuth oxyhalide quantum dots (BiOI Qds) is disclosed. According to the present disclosure, method 100 corresponds to the production of bismuth oxyhalide quantum dots without the addition of heat. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 102, the method 100 comprises creating a first solution by combining a bismuth salt and an organic solvent. In some embodiments, 1 to 10 g of bismuth, preferably 3 to 6 g, preferably 4 to 5 g, preferably 4.85 g, is dissolved in 50 to 150 mL of solvent, preferably 60 to 125 mL, preferably 83 to 104, preferably 100 mL. In some embodiments, the first solution has a % w/v of 2 to 6% w/v, preferably 3 to 5% w/v, preferably 4.85% w/v. In some embodiments, the bismuth salt is $Bi(NO_3)_3$. Suitable examples of the organic solvents include polyethylene glycol, methylene glycol, tri-ethylene glycol, and ethylene glycol. In one embodiment, the organic solvent is ethylene glycol. The dissolution process may be carried out manually or with the help of a stirrer.

At step 104, the method 100 comprises creating a second solution by dissolving an alkali metal salt in water. In some embodiments, 1 to 3 g of the alkali metal salt, preferably 1.5 to 2 g, preferably 1.66 g, is dissolved in 5 to 15 mL of the solvent, preferably 6 to 12 mL, preferably 10 mL. In some embodiments, the second solution has a % w/v of 10 to 20% w/v, preferably 13 to 17% w/v, preferably 16.6% w/v. The alkali metal salt affects the form, structure and sizes of the quantum dots produced by said method. In some embodiments, the alkali metal salt is selected from the group consisting of LiI, NaI, KI, RbI, CsI, LiBr, NaBr, KBr, RbBr, CsBr, LiCl, NaCl, KCl, RbCl, $NH_4I$, and CsCl. In one embodiment, the alkali metal salt is KI. The alkali metal salt is dissolved in water. The water may be tap water, distilled water, deionized water, deionized distilled water, filtered water, or seawater. In a preferred embodiment, the water is distilled water.

At step 106, the method 100 comprises mixing the first solution and the second solution to form a dual mixture. The dual mixture may be obtained by pouring, combining and/or mixing the second solution into or with the first solution. The mixing may be done slowly, and the first solution and second solution may be constantly stirred while being mixed. Stirring helps in maintaining uniform concentrations of the solutions in the mixture. Stirring can be done intermittently or continuously. In one embodiment, the stirring is done manually. In another embodiment, stirring is done by a stirrer. Suitable examples of stirrers that may be used include a magnetic stir bar, a stirring rod, an impeller, a shaking platform, a pump, a sonicator, a gas bubbler, and the like. In a preferred embodiment, the stirrer is a magnetic stir bar.

The dual mixture may be stirred for a period of up to 15 minutes, preferably 2 to 13 minutes, more preferably 5 to 10 minutes. In one embodiment, the dual mixture may be stirred for a period of 6 to 9 minutes, preferably for a period of 8 minutes. In a specific embodiment, the dual mixture is stirred at a temperature of 15 to 25° C. In some embodiments, the dual mixture is stirred at a temperature of 16 to 24° C. In some embodiments, the dual mixture is stirred at a temperature of 17 to 23° C., preferably at a temperature of 18 to 22° C., preferably at a temperature of 19 to 21° C., preferably at a temperature of 20° C.

At step 108, the method 100 comprises combining the dual mixture and a surfactant solution wherein the surfactant solution comprises a surfactant. The surfactant solution is an aqueous solution which comprises a surfactant and water. In one embodiment, the surfactant is a non-ionic surfactant. The non-ionic surfactants are preferably selected from octyl phenol ethoxylate, a polyoxyethylene sorbitan monolaurate, a polyoxyethylene sorbitan monooleate, or a sorbitan ester. Preferably, the nonionic surfactant is an octyl phenol ethoxylate. In another embodiment, the surfactant is Arabic gum, sorbitol, sucrose, or glucose. The aqueous solution of surfactant is prepared by dissolving the surfactant in water. The water may be tap water, distilled water, deionized water, deionized distilled water, filtered water, or seawater. In a preferred embodiment, the water is distilled water. In one embodiment, 1 to 25 mL of the surfactant is added to 1 to 25 mL of water, preferably 2 to 24 mL surfactant added to 4 to 24 mL of water, preferably 3 to 23 mL surfactant added to 6 to 23 mL of water, preferably 4 to 21 mL surfactant added to 8 to 21 mL of water, preferably 5 to 20 mL surfactant added to 10 to 20 mL of water, most preferably 5 to 15 mL surfactant added to 10 to 20 mL of water. In yet another embodiment, 1 to 25 mL of surfactant is added directly to the second solution, preferably 2 to 24 mL surfactant, preferably 3 to 23 mL surfactant, preferably 4 to 22 mL surfactant, preferably 5 to 20 mL surfactant, most preferably 5 to 15 mL surfactant, without mixing the surfactant with water.

In some embodiments, when the surfactant is Arabic gum, sorbitol, sucrose, or glucose, 1 to 15 g of the surfactant is added to 1 to 25 mL of water. In one embodiment, 2 to 14 g of the surfactant is added to 4 to 24 mL of water, preferably 3 to 13 g surfactant added to 6 to 23 mL of water, preferably 4 to 12 g surfactant added to 8 to 22 mL of water, most preferably 5 to 10 g surfactant added to 10 to 20 mL of water. In yet another embodiment, 1 to 15 g of surfactant is added directly to the second solution, preferably 2 to 14 g surfactant, preferably 3 to 13 g surfactant, preferably 4 to 14 g surfactant, most preferably 5 to 10 g surfactant, without mixing the surfactant with water.

In one embodiment, the dual mixture is combined in a ratio of 1:4 wt % with the surfactant solution. In another embodiment, the dual mixture is combined in a ratio of 1:3 wt % with the surfactant solution. Preferably, the dual mixture is combined in a ratio of 1:2 wt % with the surfactant solution.

The dual mixture is slowly poured into the surfactant solution to form a final solution. Combining the dual mixture and the surfactant solution may be accompanied by stirring, wherein the stirring may be intermittent or continuous. Any suitable stirrer may be used for stirring. In one embodiment, a magnetic stir bar is used for stirring. The final solution may be stirred for a period of 10 to 15 minutes. In one embodiment, the dual mixture may be stirred for a period of 11 to 14 minutes, preferably for a period of 12 to 13 minutes. In some embodiments, the final solution is stirred at a temperature of 15 to 25° C. In some embodiments, the final solution is stirred at a temperature of 17 to 23° C. In some embodiments, the final solution is stirred at a temperature of 19 to 21° C., preferably at a temperature of 20° C.

In some embodiments, no heat is used during the method 100. In some embodiments, the first solution is prepared at a temperature of 15 to 25° C. In some embodiments, the first solution is prepared at a temperature of 17 to 23° C. In some embodiments, the first solution is prepared at a temperature of 19 to 21° C., preferably at a temperature of 20° C. In some embodiments, the second solution is prepared at a temperature of 15 to 25° C. In some embodiments, the second solution is prepared at a temperature of 17 to 23° C. In some embodiments, the second solution is prepared at a temperature of 19 to 21° C., preferably at a temperature of 20° C. In another embodiment, the first solution and the second solution are maintained at a temperature of 17 to 23° C. before mixing, preferably at a temperature of 18 to 22° C., preferably at a temperature of 19 to 21° C., preferably at a temperature of 20° C. In some embodiments, the surfactant solution and the dual mixture are maintained at a temperature of 17 to 23° C. before mixing, preferably at a temperature of 18 to 22° C., preferably at a temperature of 19 to 21° C., preferably at a temperature of 20° C. In some embodiments, all steps of the method 100 are performed at a constant temperature of 17 to 23° C., preferably at a temperature of 18 to 22° C., preferably at a temperature of 19 to 21° C., preferably at a temperature of 20° C.

The temperatures of the different solutions including the first solution, second solution and resultant mixtures preferably do not vary from one another by more than 5° C., preferably no more than 3° C. or 1° C. Preferably, the method is carried out without adding heat to any of the solutions, e.g., without any heat adsorption or release due to a phase change and/or carried out adiabatically The steps of mixing are carried out in a matter such that any exothermic or endothermic process that occurs does not result in a temperature change of any individual solution or mixture thereof that is greater than plus 5° C., preferably no more than 3° C. or 1° C.

Surfactants in the final solution may be present in an amount sufficient to prevent the agglomeration of particles. The surfactant may be present in the final solution in an amount between 0.5 to 2.2 wt %. In one embodiment, the surfactant in the final solution may be present in an amount between 0.6 to 2.1 wt %, preferably in an amount between 0.7 to 2 wt %, preferably in an amount between 0.8 to 1.9 wt %, preferably in an amount between 0.9 to 1.8 wt %, preferably in an amount between 1.0 to 1.7 wt %, preferably in an amount between 1.1 to 1.6 wt %, preferably in an amount between 1.1 to 1.5 wt %, preferably in an amount between 1.1 to 1.4 wt %, preferably in an amount between 1.2 to 1.3 wt %.

At step 110, the method comprises obtaining a final solution comprising the BiOI Qds. The final solution is subjected to filtration to obtain the BiOI Qds. In a specific embodiment, vacuum filtration is done to obtain the BiOI Qds from the final solution. Vacuum filtration accelerates the filtration process; the BiOI particles are retained on the filter while the liquid solution passes through the filter. In some embodiments, the BiOI particles are washed one or more times with an organic solvent to remove impurities and any unreacted salts. Suitable organic solvents that may be used to wash the bismuth oxyhalide particles include acetone, ethanol, formic acid, n-butanol, methanol, benzene, toluene, diethyl ether, or any combination thereof. In a preferred embodiment, the BiOI particles are washed with ethanol. In some embodiments, the BiOI particles are washed with water after washing with the organic solvent. The particles may be washed one or more times to remove unwanted substances that may be left after washing with the organic solvent.

After washing, the BiOI particles may be dried at temperatures of 100 to 115° C., preferably 105 to 110° C., preferably 108° C. to form the purified BiOI Qds. In some embodiments, the BiOI particles may be dried for a period of 2 to 4 hours, preferably for a period of 3 hours. The drying can be done by using heating appliances such as ovens, microwaves, autoclaves, hot plates, heating mantles and tapes, oil baths, salt baths, sand baths, air baths, hot-tube furnaces, and hot-air guns.

In some embodiments, the BiOI Qds preferably have a crystal size of about 1 to 20 nm, preferably 1 to 19 nm, preferably 1 to 18 nm, preferably 1 to 17 nm, preferably 1 to 16 nm, preferably 1 to 15 nm, preferably 1 to 14 nm, preferably 1 to 13 nm, preferably 1 to 12 nm, preferably 1 to 11 nm, most preferably 1 to 10 nm. In some embodiments, the BiOI Qds have a surface area of 59 to 82 $m^2/g$, preferably 60 to 81 $m^2/g$, preferably 61 to 80 $m^2/g$, preferably 62 to 79 $m^2/g$, preferably 63 to 78 $m^2/g$, preferably 64 to 77 $m^2/g$, preferably 65 to 76 $m^2/g$, preferably 66 to 75 $m^2/g$, preferably 67 to 74 $m^2/g$, preferably 68 to 73 $m^2/g$, preferably 69 to 72 $m^2/g$, preferably 71 $m^2/g$. In one embodiment, the BiOI Qds in the form of nanosheets have a thickness of 22 to 51 nm, preferably 24 to 49 nm, preferably 26 to 47 nm, preferably 28 to 45 nm, preferably 30 to 43 nm, preferably 32 to 41 nm, preferably 34 to 39 nm, preferably 36 to 38 nm, preferably 37 nm.

The BiOI Qds comprise bismuth and halide in a 1:1 molar ratio. The present method describes a method of synthesizing BiOI Qds at room temperature without the need for any thermal treatment. The BiOI Qds produced herein exhibit excellent photocatalytic properties within the visible light region, which eliminates the necessity of using UV radiations. The optical characteristics of the BiOI Qds of the present invention depict a bandgap energy ranging from 1.80 to 2 eV, which further indicates that the BiOI Qds may serve as a visible light spectrum photocatalyst. These results revealed the effectiveness of using surfactants to ease the fabrication of BiOI Qds at room temperature.

EXAMPLES

The following examples demonstrate a method of making bismuth oxyhalide quantum dots without added heat. The examples are provided solely for illustration and are not to be construed as limitations of the present disclosure, as many variations thereof are possible without departing from the spirit and scope of the present disclosure.

Example 1: Fabrication of Bismuth Oxyiodide (BiOI) Nanoparticles 4.85 g of $Bi(NO_3)_3 \cdot 5H_2O$ were dissolved in 100 mL ethylene glycol to obtain a bismuth solution. 1.66 g of KI was dissolved separately in 10 mL of distilled water to obtain a KI solution. After that, the KI solution was poured into the bismuth solution and stirred for 5 min, then poured as one portion into 400 mL distilled water (the product thus formed was labeled BiOI-W). To select the preferable surfactant impact, the previous process was performed similarly by adding 5 mL of T20, T80, and TR before adding KI. The products were filtered and washed profusely with 20 mL ethanol and 100 mL distilled water, then dried at 105° C. for three hours and kept in a tight container, and the products were labeled BiOI-T20, BiOI-T80, and BiOI-TR, respectively.

Example 2: Fabrication of Bismuth Oxyiodide (BiOI) Nanoparticles 4.85 g of $Bi(NO_3)_3 \cdot 5H_2O$ and a proper amount of surfactant were dissolved in 100 mL ethylene glycol to obtain a surfactant-bismuth dual solution. 1.66 g of KI was dissolved separately in 10 mL of distilled water to obtain a KI solution. After that, the KI solution was poured into the bismuth solution and stirred for 5 min, then poured as one portion into 400 mL distilled water to form the product.

Example 3: Fabrication of Bismuth Oxyiodide (BiOI) Nanoparticles 4.85 g of $Bi(NO_3)_3 \cdot 5H_2O$ were dissolved in 100 mL ethylene glycol to obtain a bismuth solution. The proper amount of surfactant and 1.66 g of KI was dissolved in 20 mL of distilled water to obtain a surfactant-KI dual solution. After that, the surfactant-KI dual solution was poured into the bismuth solution and stirred for 5 min, then poured as one portion into 400 mL distilled water to form the product.
Characterization of the Prepared Nanomaterials The BiOI-W, BiOI-T20, BiOI-T80, and BiOI-TR were tested by the powder X-ray diffractometer (D8 Advance, Bruker, Billerica, USA), scanning electron microscopy (SEM, JSM-IT500HR), energy-dispersive X-ray spectrometer (EDX) surface analyzer (ASAP 2020 micromeritics, USA), Fourier transform infrared spectroscopy (FTIR, Bruker TENSOR Series, Germany), and a diffuse reflectance UV-vis spectrophotometer (2600i Uv-vis, Shimadzu, JAPAN).

Figure 3A:
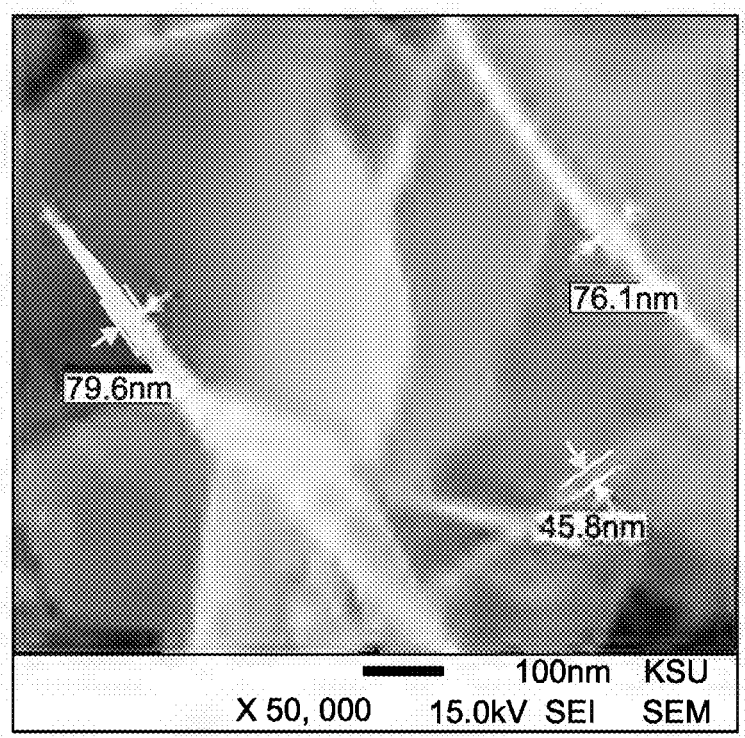
FIG. 3A shows a close-up image of comparative surface morphology and size measurement via SEM analysis of the nanomaterial formed by BiOI-W, as a comparative example, showing the formation of flakes when no surfactant is used.
Figure 3B:
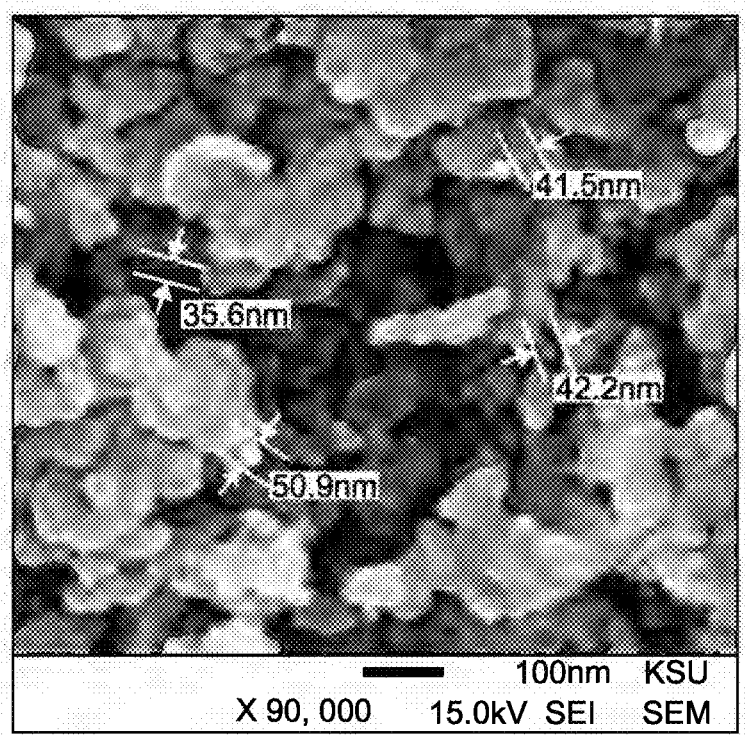
FIG. 3B shows a close-up image of comparative surface morphology and size measurement via SEM analysis of the nanomaterial formed by BiOI-T20, as a comparative example, when a low amount of surfactant is used.
Figure 3C:
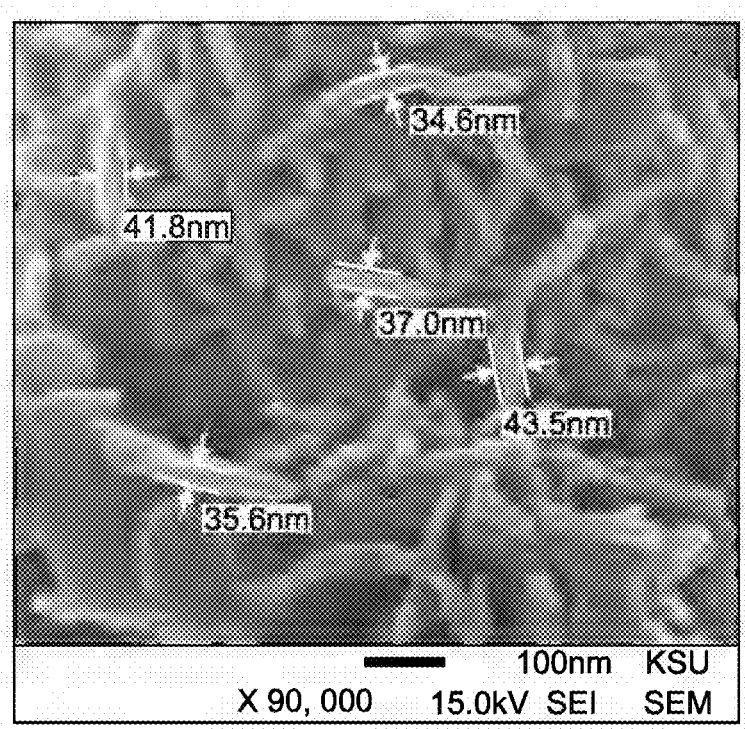
FIG. 3C shows a close-up image of comparative surface morphology and size measurement via SEM analysis of the nanomaterial formed by BiOI-T80, as a comparative example, when a low amount of surfactant is used.
Figure 3D:
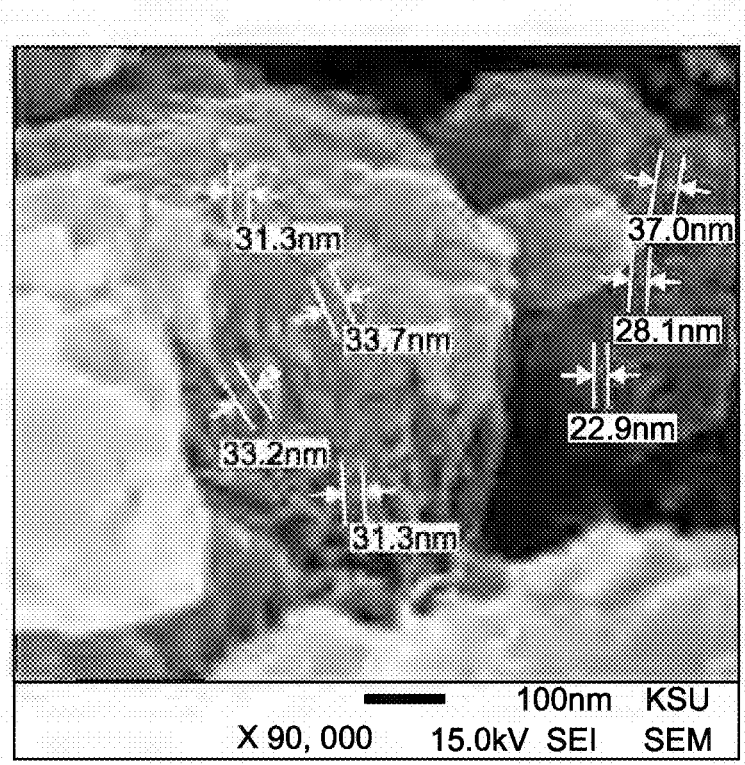
FIG. 3D shows a close-up image of comparative surface morphology and size measurement via SEM analysis of the nanomaterial formed by BiOI-TR, as a comparative example, when a low amount of surfactant is used.
Figure 4A:
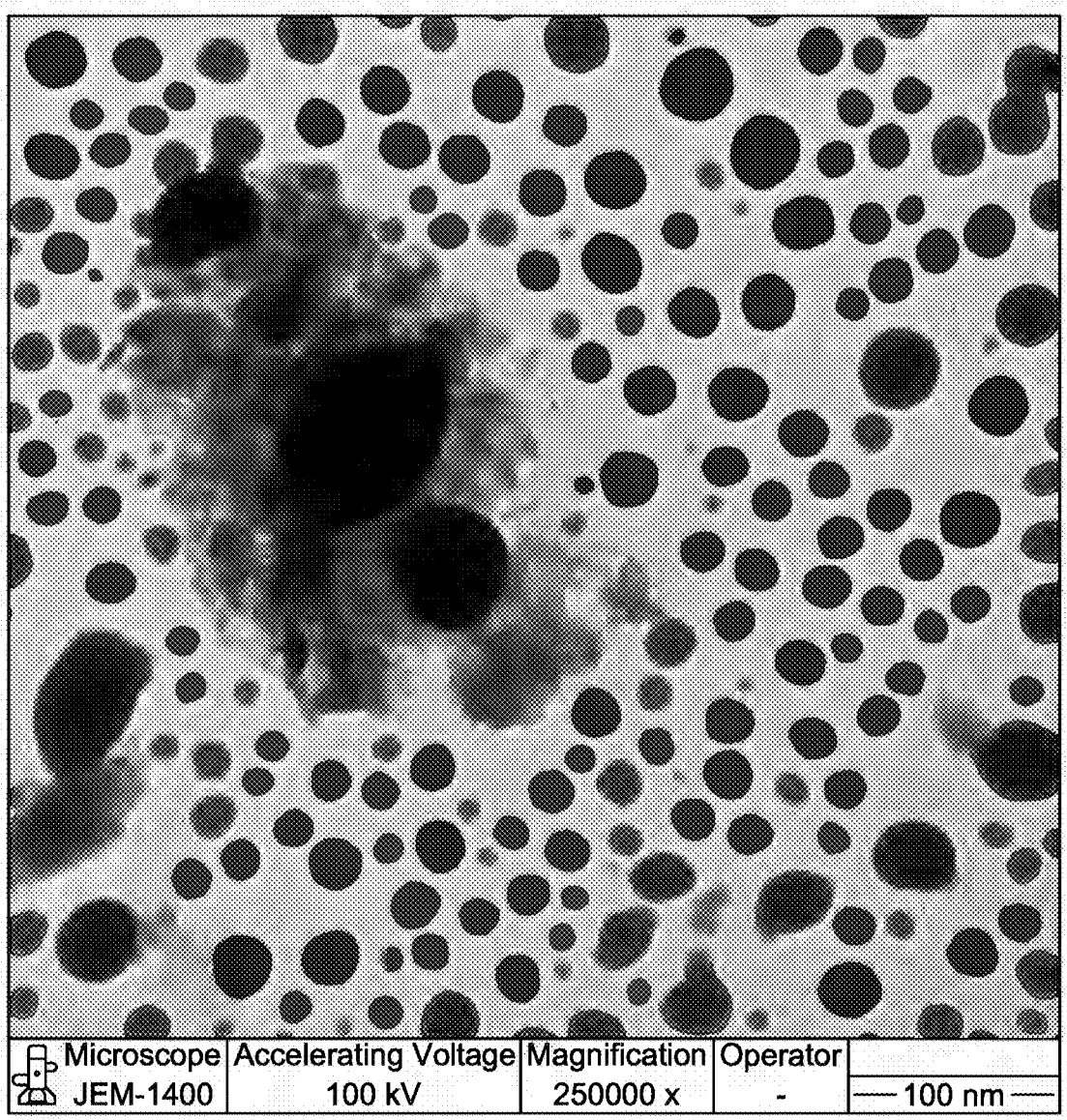
FIG. 4A shows a detailed morphology via transmission electron microscope (TEM) analysis for BiOI-W, as a comparative example, showing the mixture of nanomaterials when no surfactant is used.
Figure 4B:
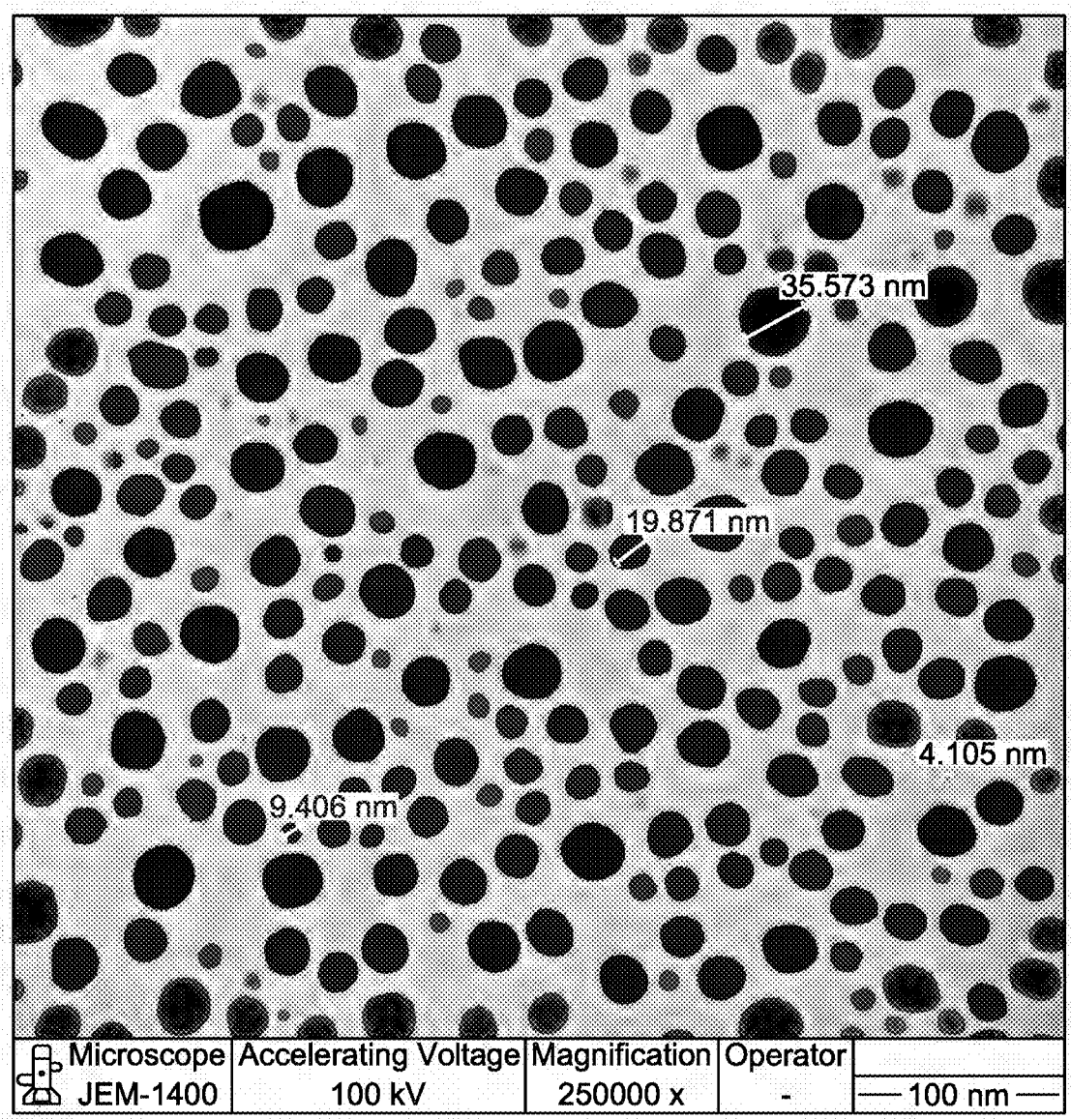
FIG. 4B shows a detailed morphology via transmission electron microscope (TEM) analysis for BiOI-T20, as a comparative example, showing the mixture of nanomaterials and Qds when a low amount of surfactant is used.
Figure 4C:
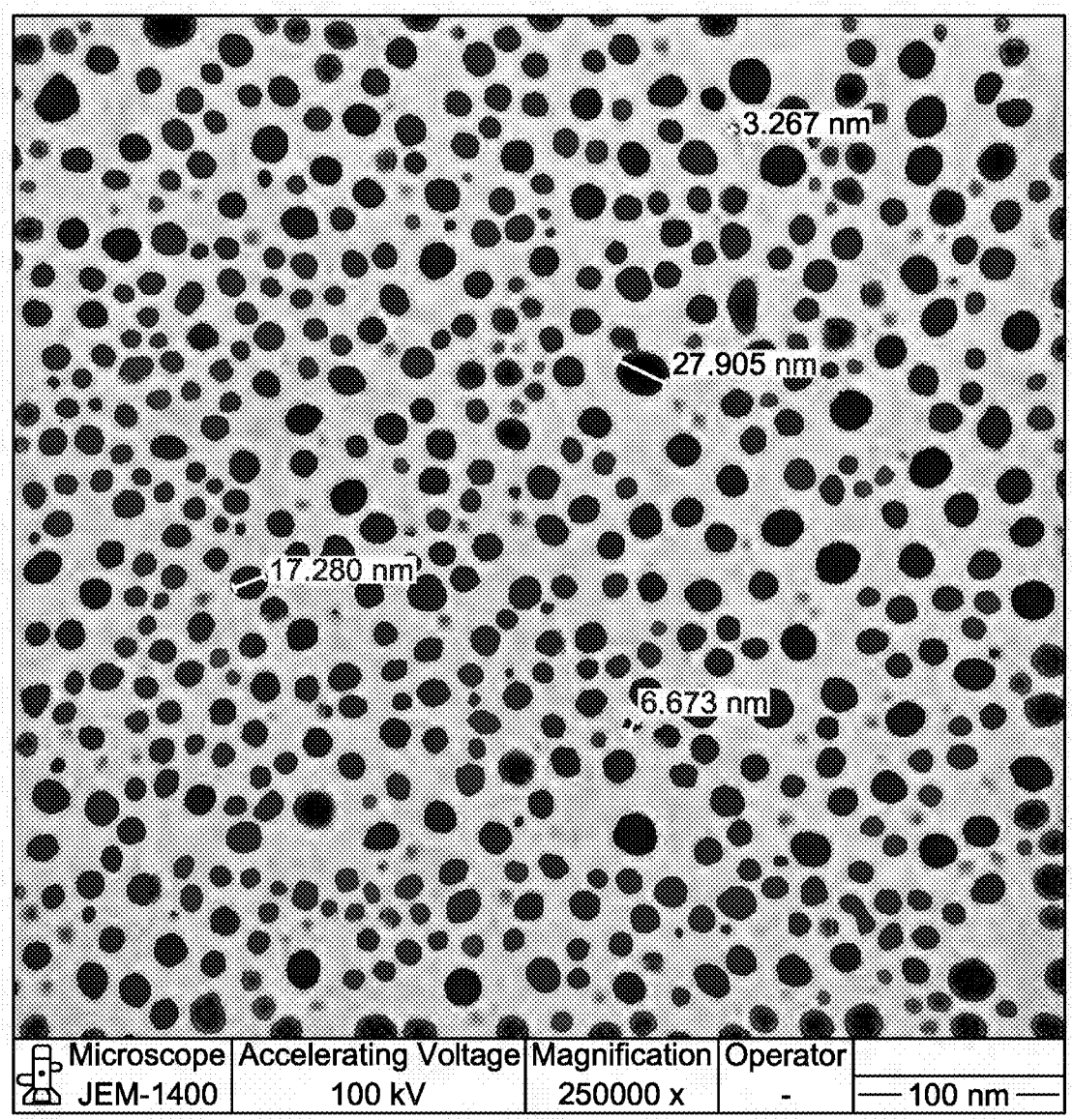
FIG. 4C shows a detailed morphology via transmission electron microscope (TEM) analysis for BiOI-T80, as a comparative example, showing the mixture of nanomaterials and Qds when a low amount of surfactant is used.
Figure 5A:
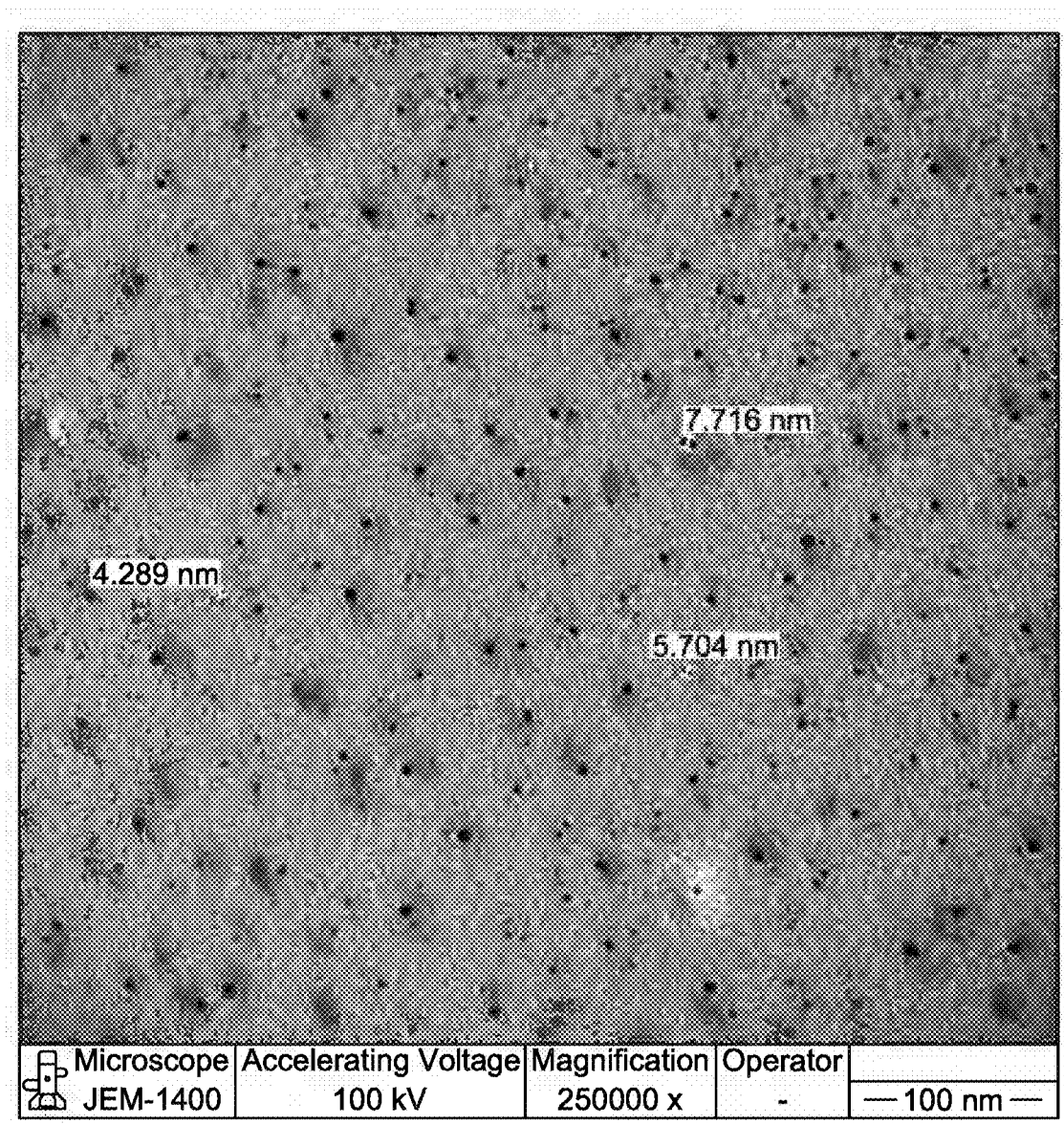
FIG. 5A shows the detailed morphology via TEM analysis for BiOI-TR, according to certain embodiments, showing BiOI QDs at 250,000 magnification.
Figure 5B:
FIG. 5B shows the detailed morphology via TEM analysis of BiOI QDs, according to certain embodiments, viewed at 50,000 times magnification.
Figure 5C:
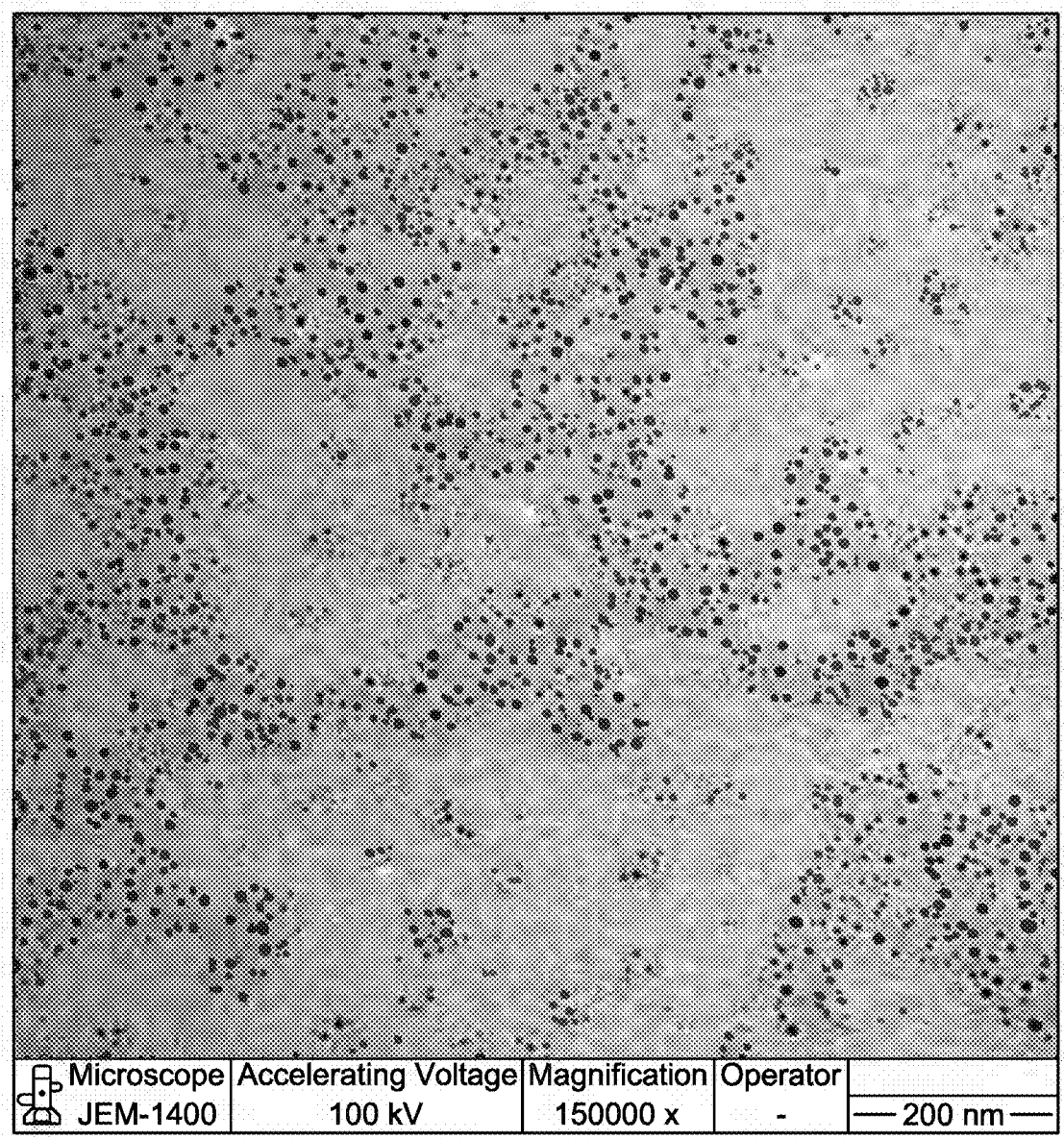
FIG. 5C shows BiOI QDs, according to certain embodiments, via TEM image viewed at 150,000 times magnification.
Figure 5D:
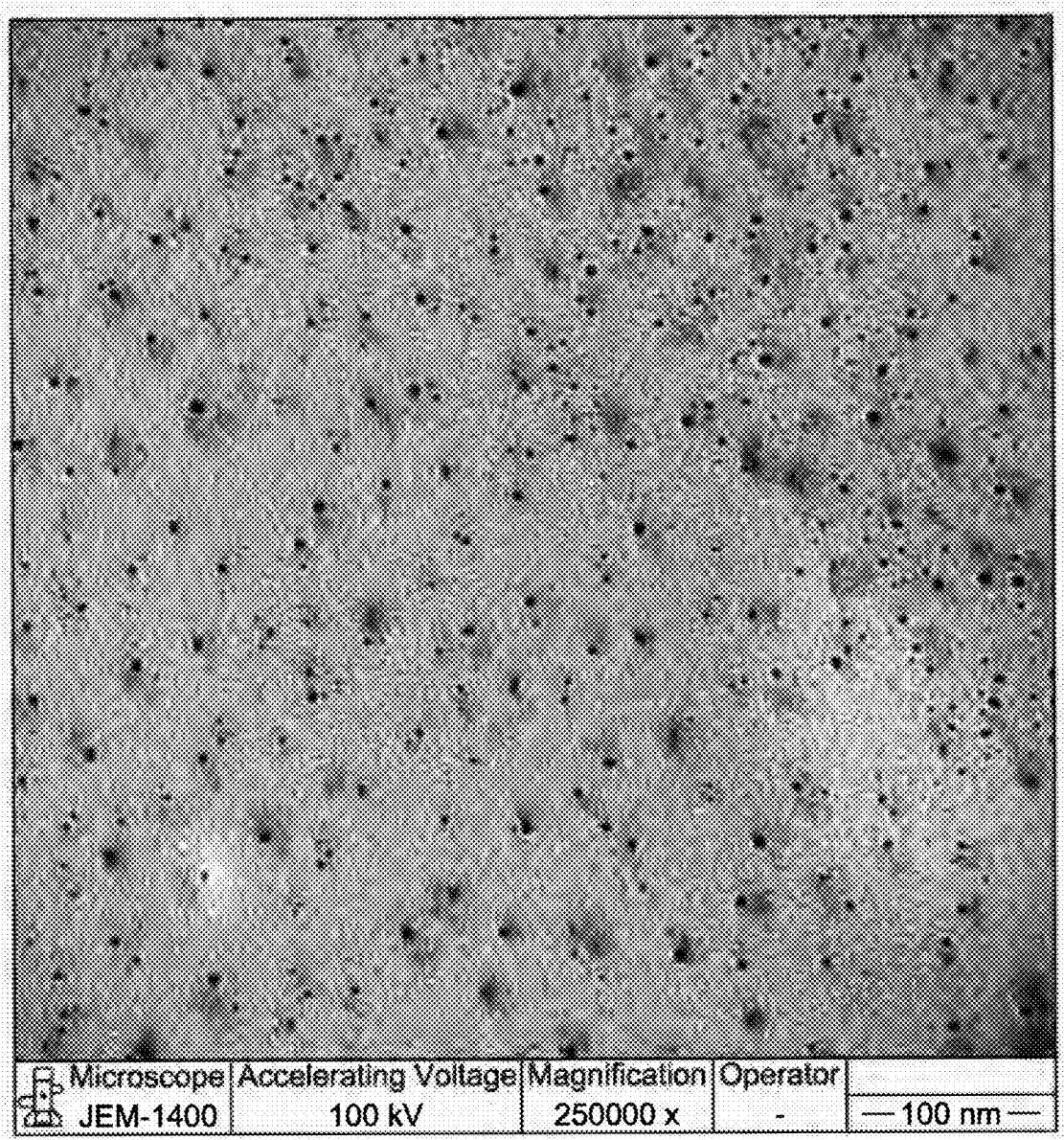
FIG. 5D shows BiOI QDs, according to certain embodiments, via TEM image viewed at 250,000 times magnification.
Figure 6A:
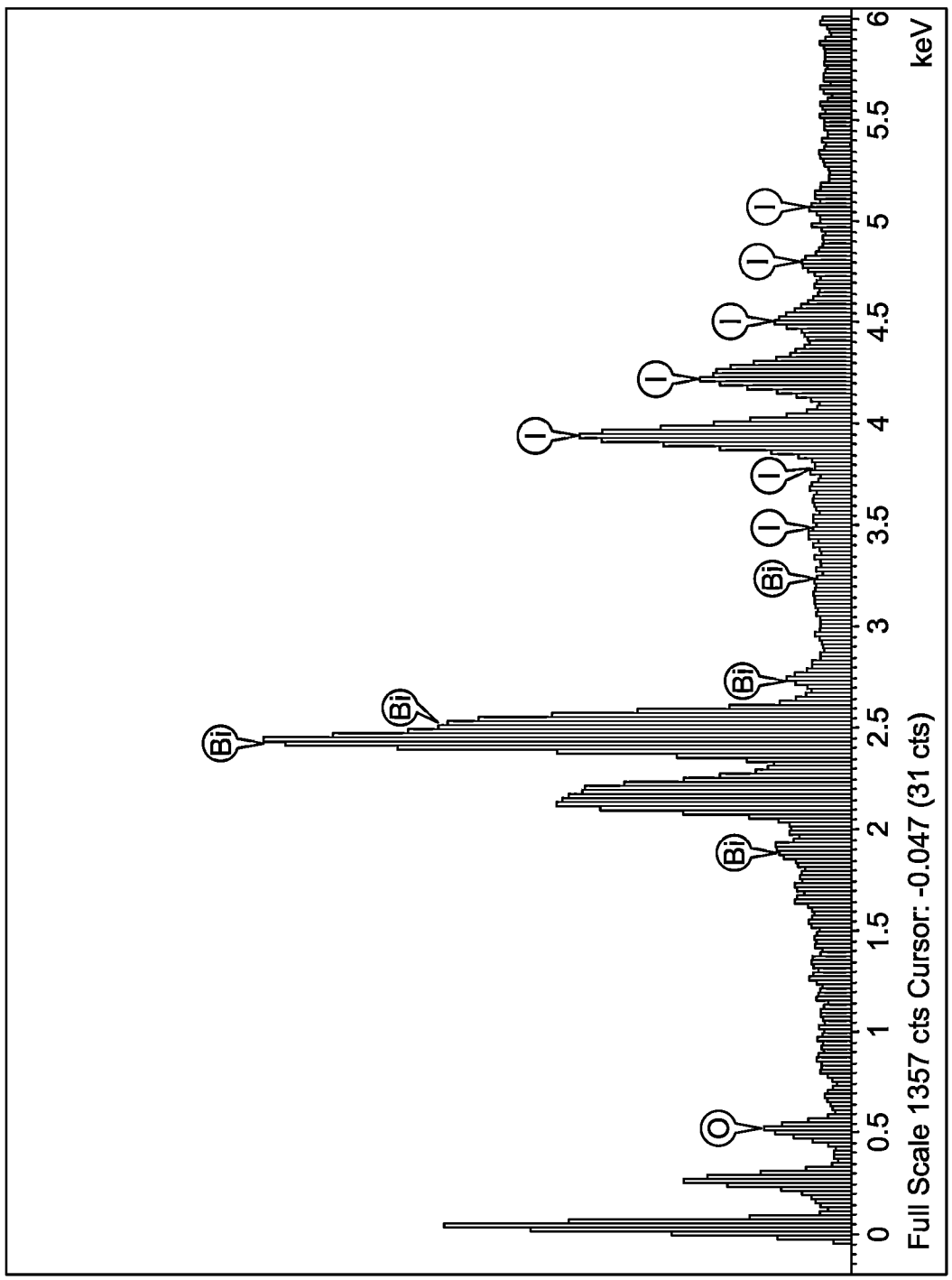
FIG. 6A shows energy-dispersive X-ray spectroscopy (EDX) results of BiOI-W, according to certain embodiments.
Figure 6B:
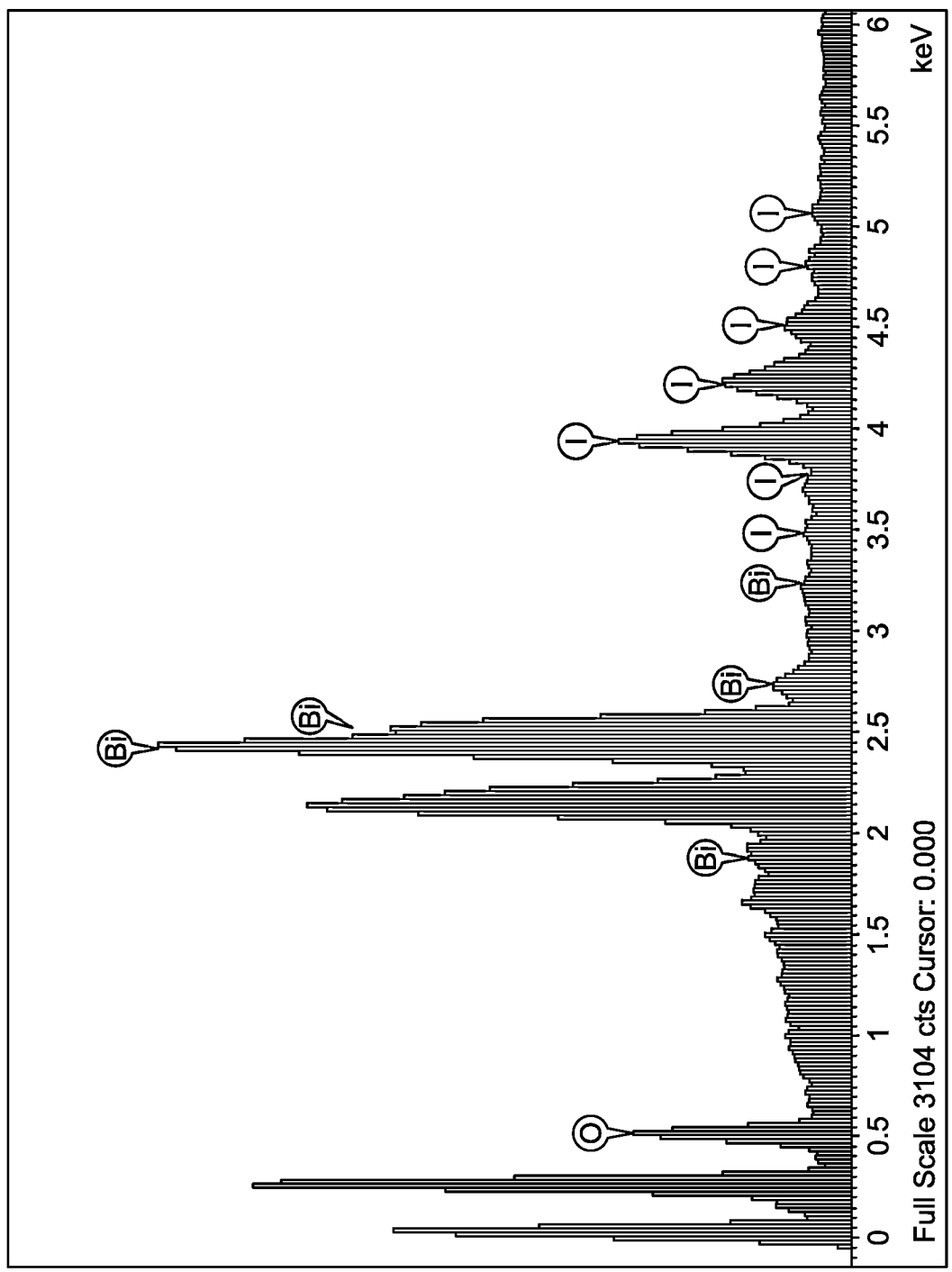
FIG. 6B shows EDX results of BiOI-T20, according to certain embodiments.
Figure 6C:
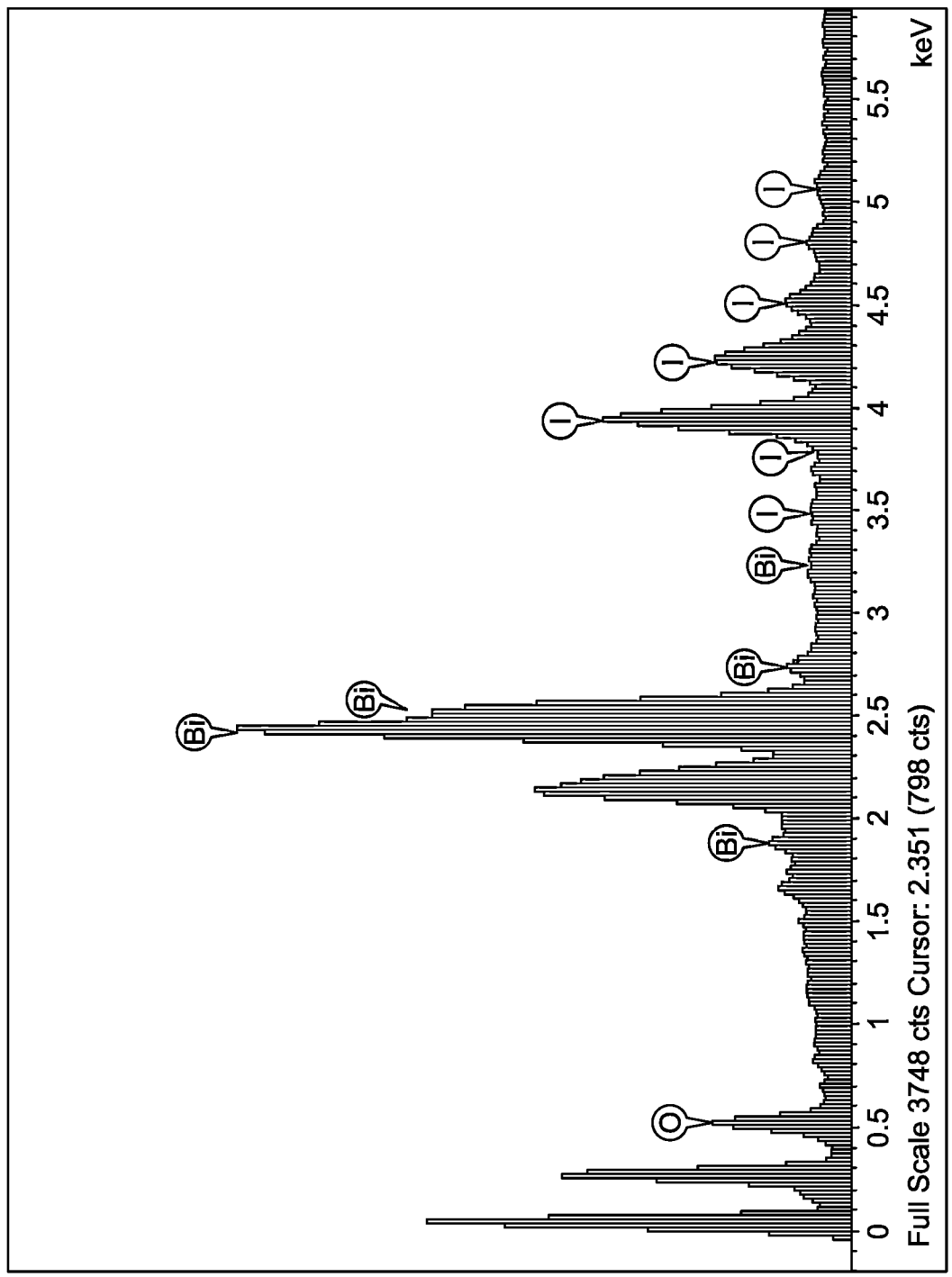
FIG. 6C shows EDX results of BiOI-T80, according to certain embodiments.
Figure 6D:
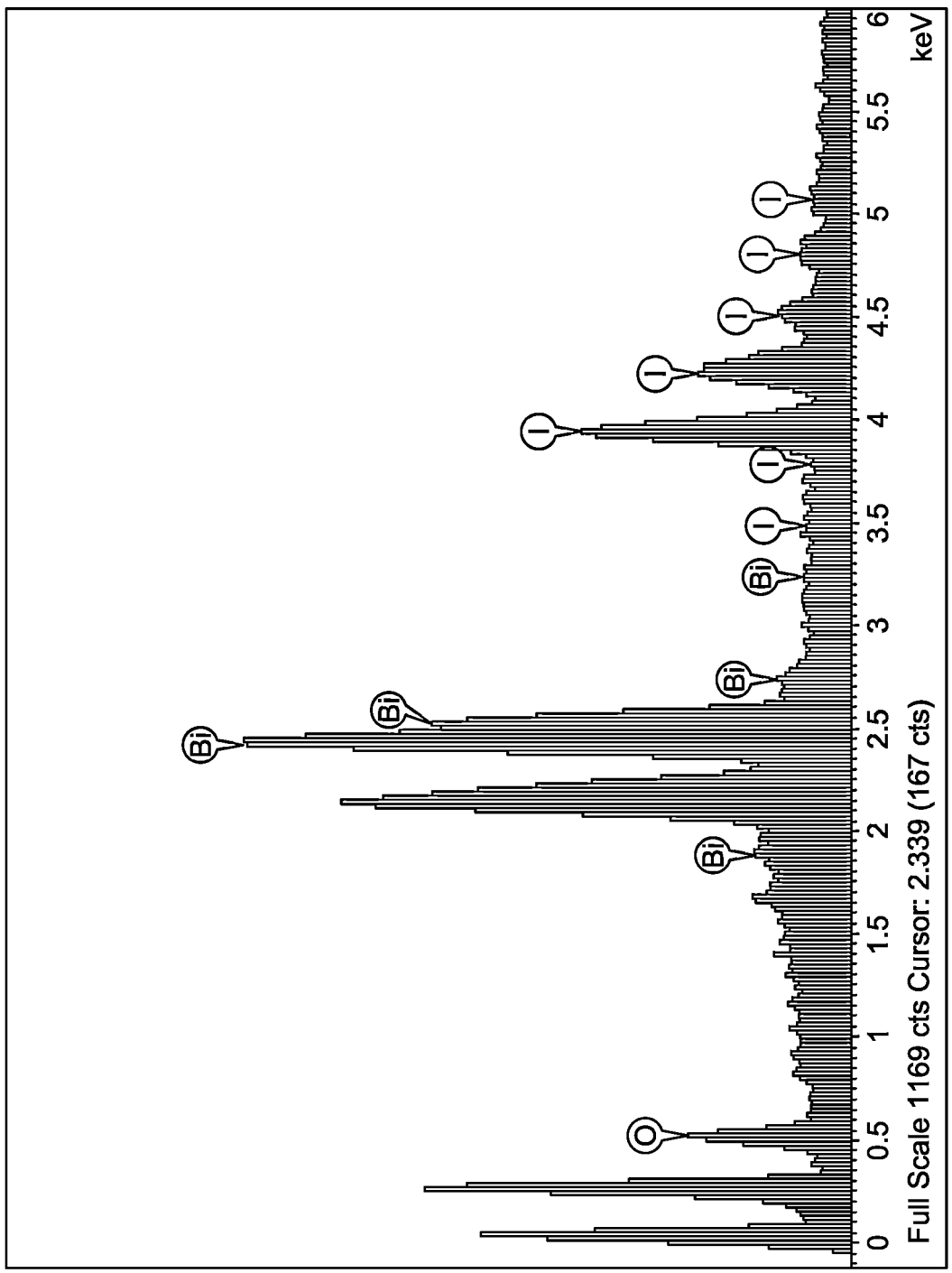
FIG. 6D shows EDX results of BiOI-TR, according to certain embodiments.

The surface morphology of the prepared nanomaterials was explored via SEM analysis. FIGS. 2A-2D shows an overview of BiOI-W, BiOI-TR, BiOI-T20, and BiOI-T80 nanomaterials, respectively. The results reveal that the BiOI-W takes the form of large lumps, while this agglomeration decreases in the BiOI-TR, BiOI-T20, and BiOI-T80. The close-up image (FIG. 3A) showed that the BiOI-W is in the form of flakes while adding TR, T20, and T80-produced BiOI nanoparticles. The thickness of the BiOI-W nanosheet ranged between 45.0 and 79.0 nm, while the size ranges for BiOI-TR (FIG. 3D), BiOI-T20 (FIG. 3B), and BiOI-T80 (FIG. 3C) in the range of 22.9 to 37.0 nm, 35.6 to 50.9 nm, and 35.6 to 43.5 nm, respectively. Additionally, the detailed morphologies of BiOI-W, BiOI-TR, BiOI-T20, and BiOI-T80 are investigated utilizing the transmission electron microscope (TEM) technique. The TEM images for BiOI-W, BiOI-T20, BiOI-T80, and BiOI-TR, are depicted in FIGS. 4A-4C, respectively. The TEM images reveal that BiOI-T20 and BiOI-T80 are mixtures of Qds and larger nanoparticles of less than 36.0 and 28.0 nm, respectively, while the addition of TR produced only BiOI-Qds of less than 8.0 nm. Further, the EDX was utilized to determine the elemental composition of the BiOI-W, BiOI-T20, BiOI-T80, and BiOI-TR, respectively (FIGS. 6A-6D). The BiOI-W, BiOI-TR, BiOI-T20, and BiOI-T80 showed Bi:I molar ratio of 1:1 was conserved in the four products, indicating a successful fabrication of BiOI. However, the oxygen contents were a higher than theortical, which may be attributed to the moisture content. This method produced smaller particles than those synthesized via conventional routes.

Figure 7A:
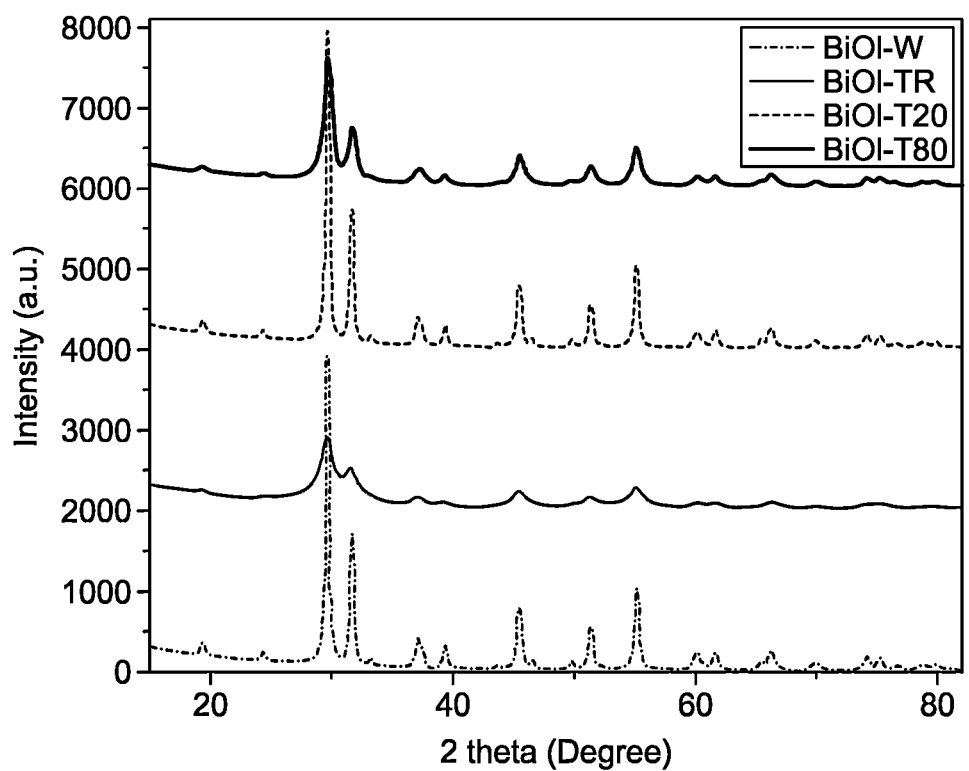
FIG. 7A shows X-ray diffractogram (XRD) pattern for BiOI-W, BiOI-TR, BiOI-T20, and BiOI-T80 nanomaterials, according to certain embodiments.

FIG. 7A illustrates the crystallography of BiOI-W, BiOI-TR, BiOI-T20, and BiOI-T80 being analyzed via the X-ray diffraction pattern (XRD). The Bragg's angle was employed for determining the crystal size via the Debye-Scherer's relation (Eq. (1)), while the lattice parameters (a and c) and imperfection of lattice (F) were computed by Eq. (2), (3), and (4), respectively.

$$D = 0.9\lambda/\beta \cos\theta \tag{1}$$

$$a = \lambda/3\sqrt{}\sin\theta \tag{2}$$

$$c = \lambda/\sin\theta \tag{3}$$

$$\varepsilon = \beta/4 \cos\theta \tag{4}$$

D, λ, and β represent the average crystal size, radiation wavelength, and peak width at its half-maximum.

Table 1A and Table 1B shows the positions of the diffraction peaks obtained from the four BiOI products. The XRD pattern for BiOI-W, BiOI-TR, BiOI-T20, and BiOI-T80 can be allocated to the BiOI tetragonal-lattice structure (JCPDS 10-0445). Also, the excellent crystallinity of BiOI-W and BiOI-T20 was reflected via their intense peaks. Conversely, the BiOI-TR and BiOI-T80 showed weak crystallinity, which aligned with the SEM findings. The XRD results with no impurity peaks suggested that the prepared nanomaterials were composed entirely of Bi, O, and I.

TABLE 1A

XRD results for BiOI-W, BiOI-T20, BiOI-T80, and BiOI-TR.

| | Position of the diffraction peak (2θ°) | | | |
|---|---|---|---|---|
| Plane number | BiOI-W | BiOI-T20 | BiOI-T80 | BiOI-TR |
| (002) | 19.4 | 19.3 | 19.3 | 19.3 |
| (011) | 24.2 | 24.1 | 24.0 | — |
| (012) | 29.6 | 29.7 | 29.7 | 29.7 |
| (110) | 31.6 | 31.6 | 31.6 | 31.5 |
| (013) | 37.1 | 37.0 | 37.2 | 37.0 |
| (004) | 39.3 | 39.3 | 39.4 | 39.2 |
| (014) | 45.5 | 45.5 | 45.4 | 45.4 |
| (114) | 51.4 | 51.3 | 51.3 | 51.2 |
| (212) | 55.2 | 55.1 | 55.1 | 55.0 |
| (115) | 60.1 | 60.1 | 60.0 | 59.9 |
| (204) | 61.6 | 61.6 | 61.7 | 61.5 |

TABLE 1B

| | Lattice parameters | | | |
|---|---|---|---|---|
| Parameter | BiOI-W | BiOI-T20 | BiOI-T80 | BiOI-TR |
| D (nm) | 18.611 | 6.533 | 17.596 | 3.556 |
| a (Å) | 0.228 | 0.228 | 0.228 | 0.227 |
| c (Å) | 6.021 | 6.022 | 6.021 | 6.021 |
| ε (a.u) | 0.372 | 0.372 | 0.372 | 0.372 |

Figure 7B:
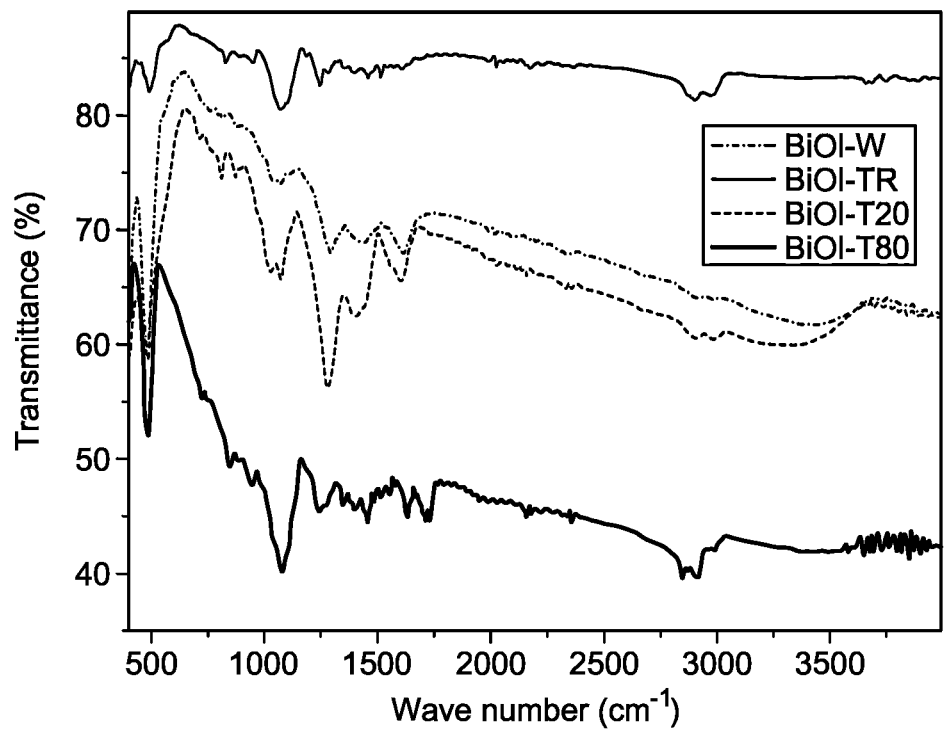
FIG. 7B shows Fourier Transform Infrared (FTIR) spectra for BiOI-W, BiOI-TR, BiOI-T20, and BiOI-T80 nanomaterials, according to certain embodiments.
Figure 8A:
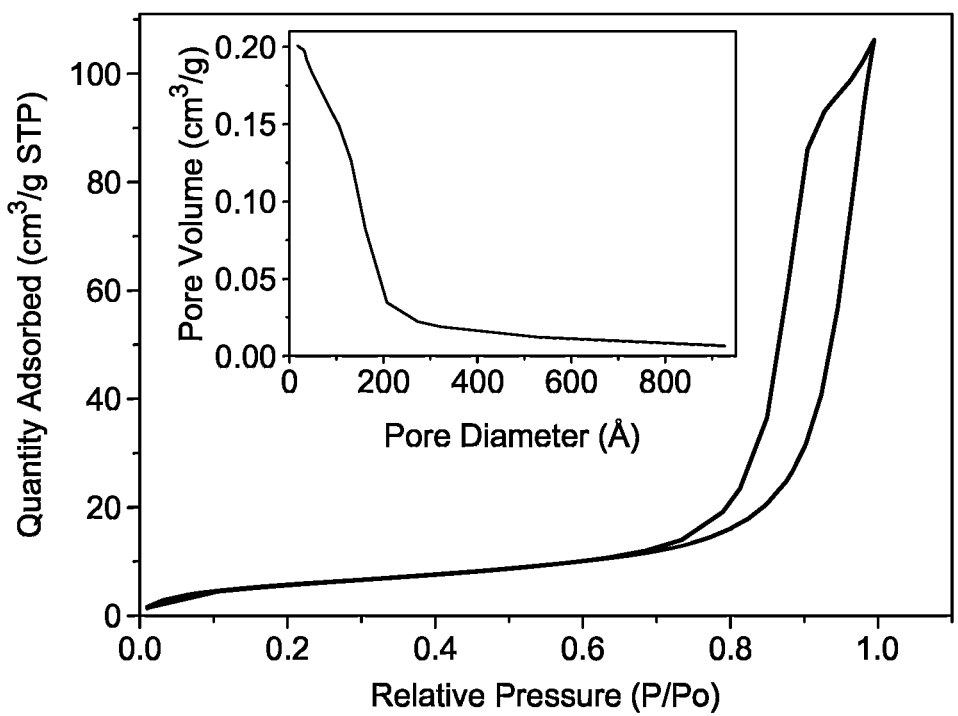
FIG. 8A shows $N_2$ adsorption/desorption isotherm and pore-size distribution of BiOI-W, according to certain embodiments.
Figure 8B:
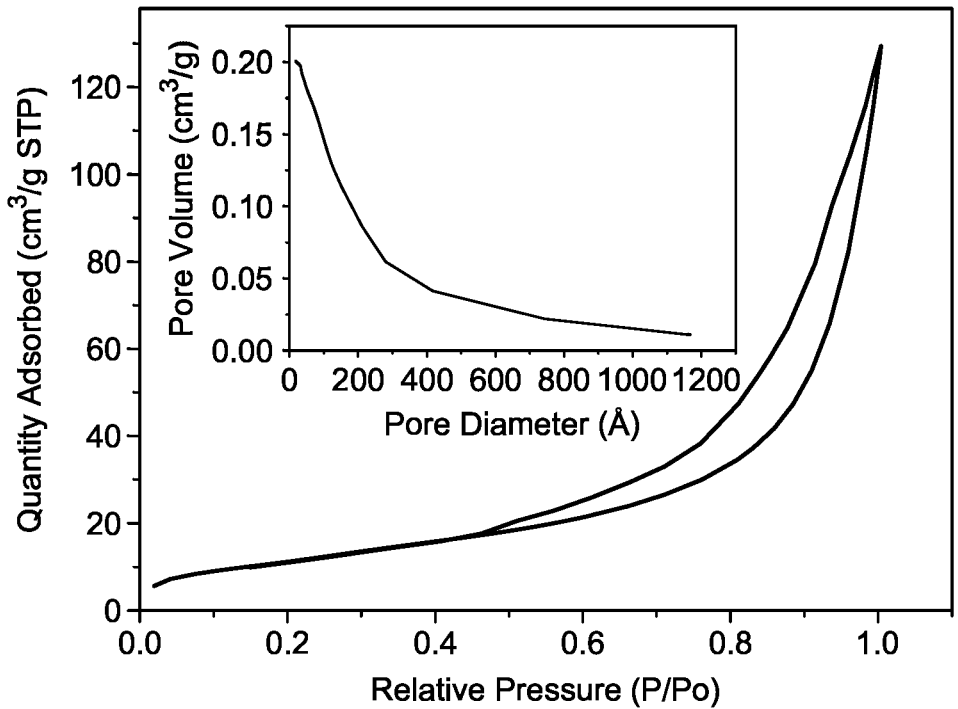
FIG. 8B shows $N_2$ adsorption/desorption isotherm and pore-size distribution of BiOI-T20, according to certain embodiments.
Figure 8C:
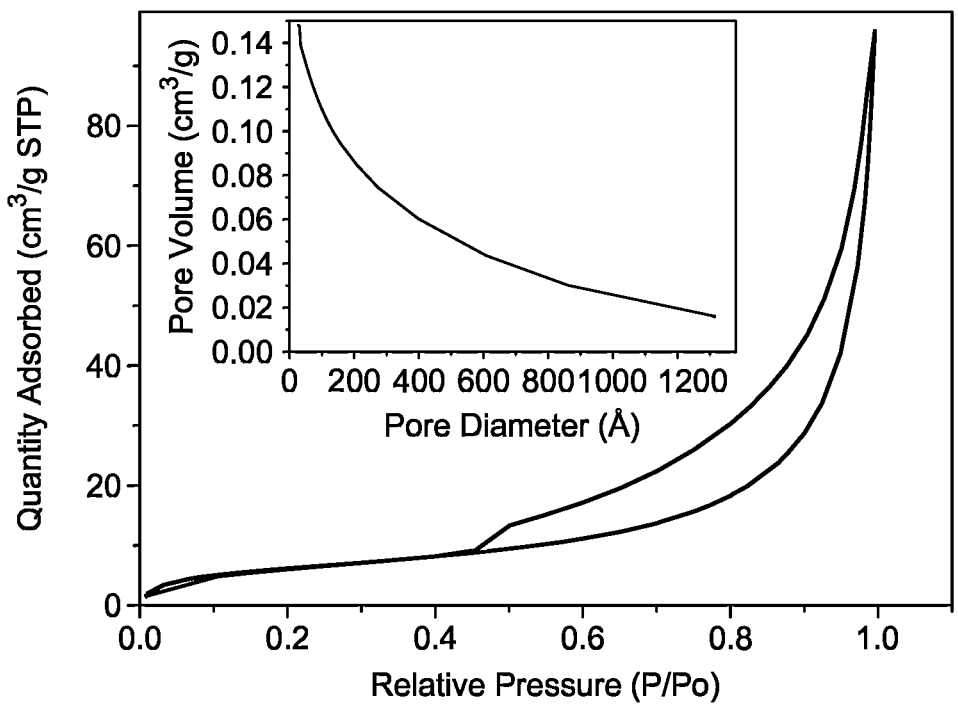
FIG. 8C shows $N_2$ adsorption/desorption isotherm and pore-size distribution of BiOI-T80, according to certain embodiments.
Figure 8D:
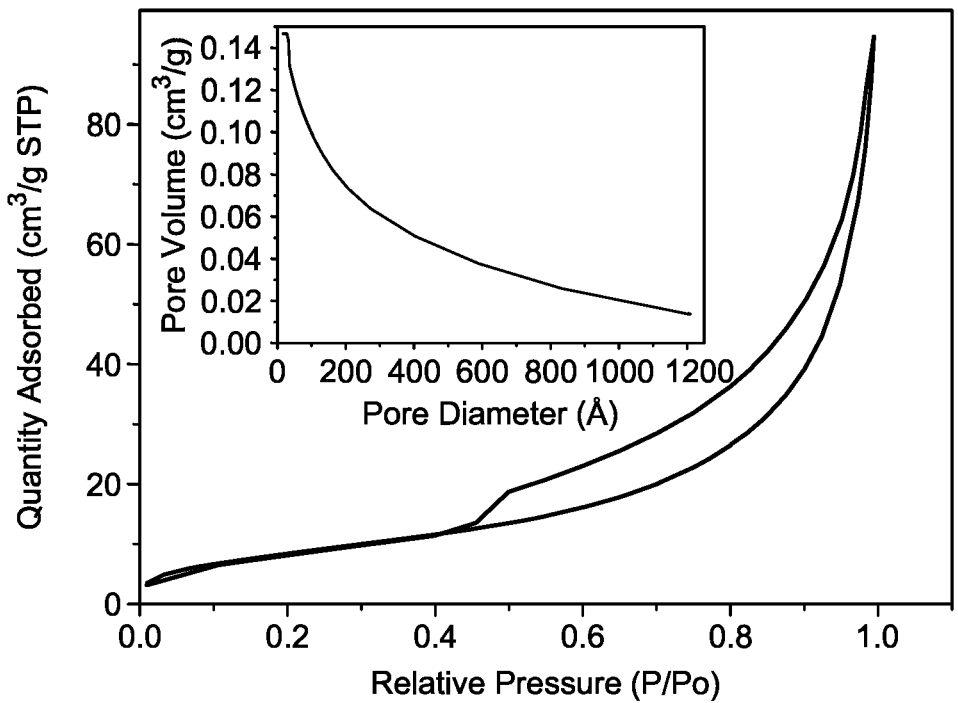
FIG. 8D shows $N_2$ adsorption/desorption isotherm and pore-size distribution of BiOI-TR, according to certain embodiments.
Figure 9A:
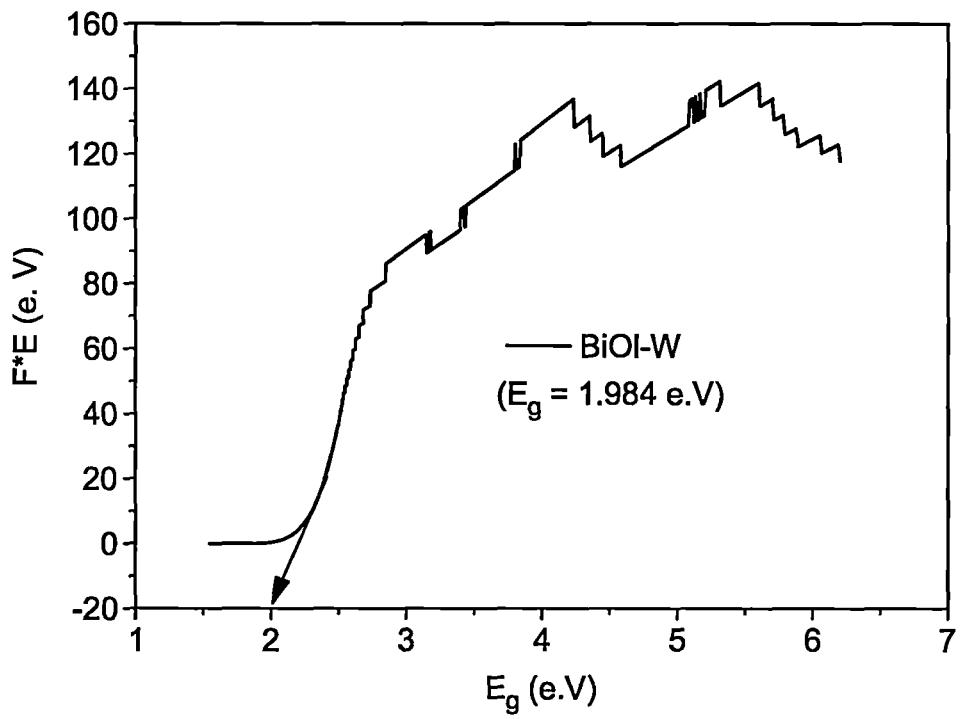
FIG. 9A shows bandgap energy (Eg) values for BiOI-W nanomaterial, according to certain embodiments.
Figure 9B:
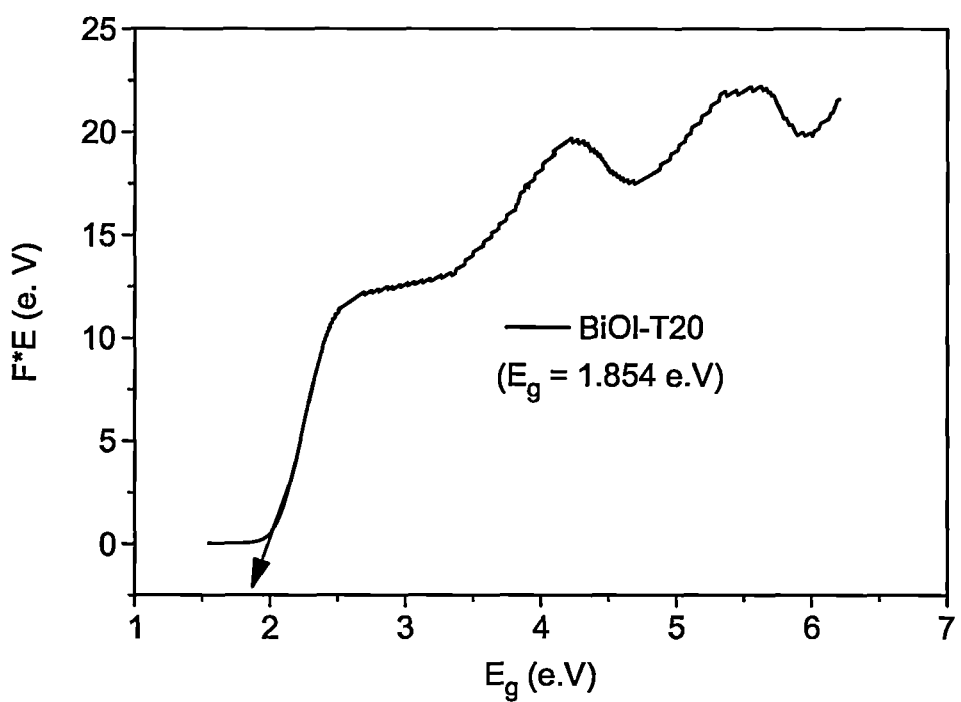
FIG. 9B shows Eg values for BiOI-T20 nanomaterials, according to certain embodiments.
Figure 9C:
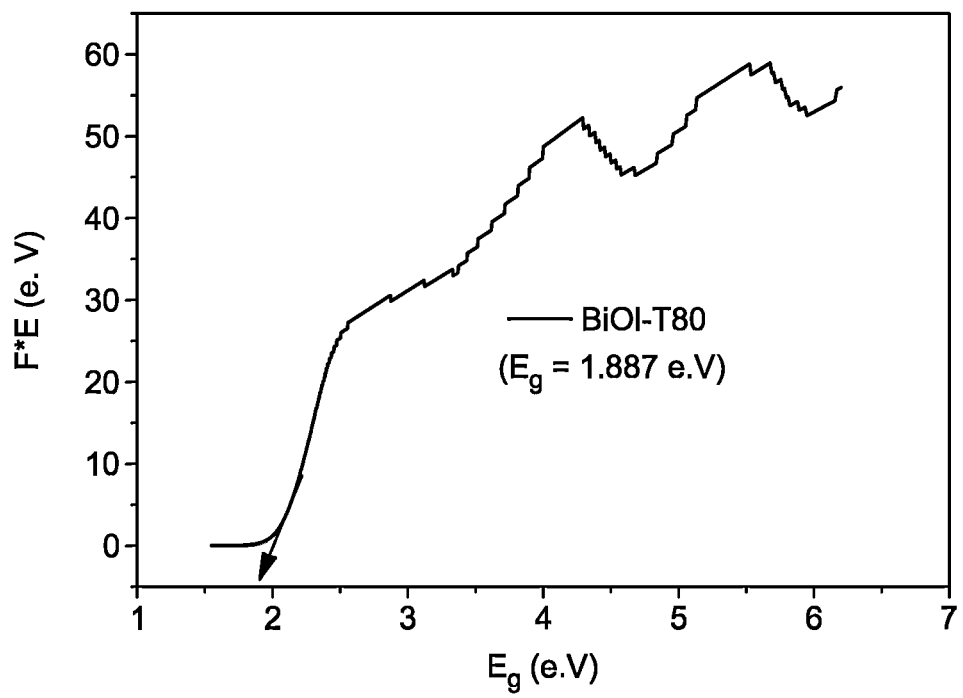
FIG. 9C shows Eg values for BiOI-T80 nanomaterials, according to certain embodiments.
Figure 9D:
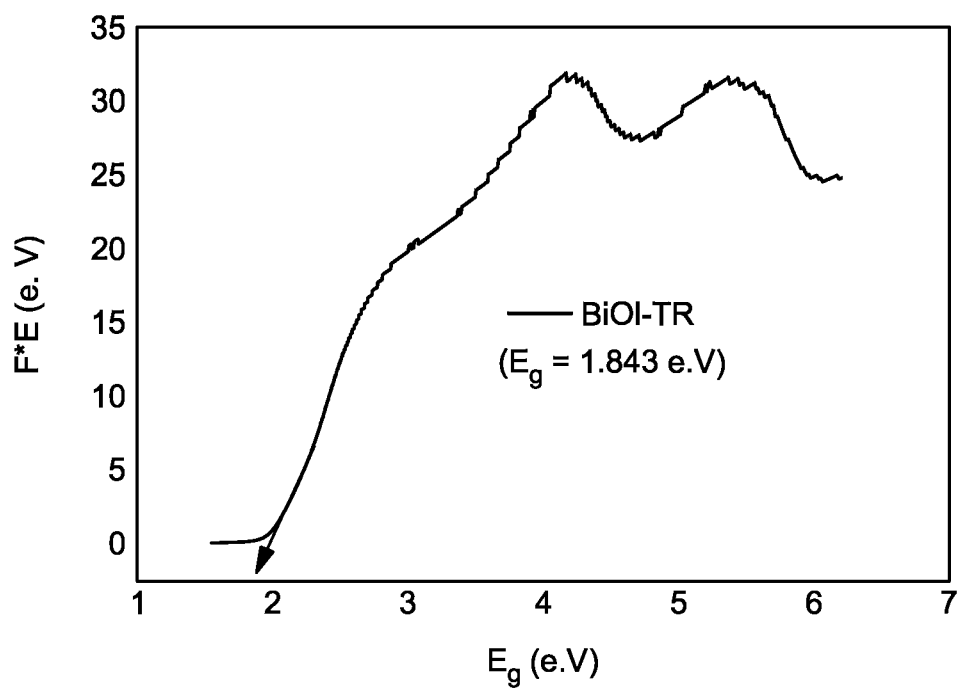
FIG. 9D shows Eg values for BiOI-TR nanomaterials, according to certain embodiments.

FIG. 7B shows Fourier Transform Infrared (FTIR) results for BiOI-W, BiOI-TR, BiOI-T20, and BiOI-T80. Bi—I, O—I, and Bi—O bonds are represented by vibrational peaks between 400 and 850 cm 1. The O—H of adsorbed moisture accounts for broadband between 3200 and 3500 cm$^{-1}$.

Notably, the FT-IR analysis shows that water molecules on the BiOIs may account for the little increase in oxygen found in the EDX results.

Furthermore, $N_2$ adsorption-desorption was utilized to study the surface characteristics of the BiOI-W, BiOI-TR, BiOI-T20, and BiOI-T80, and their pore size (PS), pore volume (PV), and surface area (SA) were investigated. FIGS. 8A-8D illustrates the obtained $N_2$ adsorption-desorption isotherms for BiOI-W, BiOITR, BiOI-T20, and BiOI-T80, respectively. The BiOI-W possessed a type H2(b) hysteresis loop with a steep desorption division due to pore blockage and complicated structures of a wide-pore range that usually come with such loop type. Conversely, the BiOI-TR, BiOI-T20, and BiOI-T80 showed an H3 hysteresis loop distinctively allocated to aggregates by cylindrical macropores. These differences in the steep degree and obtained loops types indicated differences in the fabricated BiOIs nanoparticles construction. The SA, PS, and PV findings of the BiOI-W, BiOI-TR, BiOI-T20, and BiOI-T80 monitored in Table 2 were aligned with the SEM and TEM results. When the surface areas of the four BiOIs are compared, it is clear that adding surfactants to improve the characteristics of BiOI synthesized at room temperature is beneficial, with TR having an edge over the other examined surfactants. Compared to recent methods in the literature, the BiOI-TR, BiOI-T20, and BiOI-T80 fabricated in this study showed better surface properties (Table 3). In one embodiment the bismuth oxyhalide quantum dots are in the form of nanosheets having a thickness of 22 to 51 nm.

TABLE 2

Surface characteristics of BiOI-W, BiOI-T20, BiOI-T80, and BiOI-TR

| Photocatalyst | SA (m$^2$/g) | PS (Å) | PV (cm$^3$g$^{-1}$) |
|---|---|---|---|
| BiOI-W | 22.165 | 274.142 | 0.155 |
| BiOI-T20 | 59.135 | 207.115 | 0.116 |
| BiOI-T80 | 68.462 | 173.578 | 0.123 |
| BiOI-TR | 81.864 | 156.219 | 0.182 |

TABLE 3

Comparison of the surface characteristics of BiOI-TR, BiOI-T20, and BiOI-T80 fabricated in this study with literature findings.

| BiOI Photocatalyst | SA (m$^2$/g) | Particle size | Shape |
|---|---|---|---|
| BiOI | 7.20 | 5-40 nm | Irregular Sheets and plates |
| BiOI, $Bi_7O_9I_3$, and $Bi_4O_5I_2$ | 9.7, 35.4 and 66.5 | Microscale | Stacked nanosheets |
| BiOI, $Bi_4O_5I_2$, $Bi_5O_7I$, and $Bi_7O_9I_3$ | 5.5, 7.12, 8.51, and 12.25 | Microscale | Nanosheets |
| BiOI- CNFs | 12.3-6.0 | 20 nm | Rose-like |
| $Bi_4O_5I_2$ and $Bi_5O_7I$ | 31.6-15.5 | Microscale | Lumps |
| BiOI-R and BiOI-S | 42.8-7.1 | Microstructure | Flower-like |
| BiOI-T20, BiOI-T80, and BiOI-TR | 22.0-81.8 | 3.0-36.0 | Nanoparticles and quantum dots |

One of the primary purposes of employing BiOI as a photocatalyst is to replace risky UV radiation with harmless visible light. Hence, the optical characteristics of BiOI-W, BiOI-T20, BiOI-T80, and BiOI-TR were investigated from 300 nm to 800 nm. The bandgap energy (Eg) of the BiOI-W, BiOI-T20, BiOI-T80, and BiOI-TR was determined employing the Kubelka-Munk equation (Eq. (5)).

$$F(R)*h\gamma/t=\beta(h\gamma-E_g)^n \quad (5)$$

Where F(R) is the reflectance function, h is Plank constant, α, and γ are the absorption coefficient and photonic frequency, while n is an interband transition constant (for BiOI, n=1). The linear portion in the graph resulting from the plots of (F(R)hv/t)n versus (hv) was extrapolated to the x-axis (hv=0) to estimate the Eg value. FIG. 9A-9D illustrates the Eg determination of BiOI-W, BiOI-T20, BiOI-T80, and BiOI-TR, respectively; their Eg values were 1.984, 1.854, 1.887, and 1.843 eV, respectively. These findings proposed BiOI-W, BiOI-T20, BiOI-T80, and BiOI-TR nanoparticle's usability as a visible light spectrum photocatalyst.

One of the primary goals of improving photocatalytic performance is the fabrication of a nanoscale BiOI. As stated in the fundamentals of precipitation-gravimetric analysis, larger particles may form if the formed crystals stay in the mother solution for an extended period (digestion step) hence, a small particle size BiOI may result via short synthesis duration with the help of surfactant as an aggregation preventer. Equations (6)-(8) explain the suggested reaction mechanism for synthesizing BiOIs.

$$Bi(NO_3)_3 \cdot 5H_2O \rightarrow Bi_3^+ + 3NO_3^- + 5H_2O \quad (6)$$

$$Bi^{3+} + 3H_2O \rightarrow Bi(OH)^3 + 3H_3O^+ \quad (7)$$

$$Bi(OH)_3 + I^- \rightarrow BiOI + H_2O + OH^- \quad (8)$$

A straightforward, rapid, affordable, one-pot route for preparing BiOI nanomaterials at room temperature, using various surfactants is described. The success of the fabrication of BiOI nanoparticles was confirmed via several characterization methods. The BiOI-W nanoparticles were the largest ones among the obtained nanoparticles. Using T20, T80, and TR organic surfactants minimized the particle size of the resulting BiOI nanoparticles. The TEM findings showed the downsizing of the produced BiOI with the addition of the T20, T80, and TR surfactants. It is worth mentioning that BiOI Qds of less than 8.0 nm were obtained when TR was utilized. The SA of BiOI-W was 22.165 m²/g, and with T20, T80, and TR used in the preparations, the SA increased to 59.135, 68.462, and 81.864 m²/g, respectively. Although each of the three tested surfactants reduced the particle size of BiOI, the obtained results indicated the superiority of utilizing TR over the other tested surfactants for synthesizing BiOI Qds. This facile method of preparing BiOI Qds may unravel a scalable pathway for mass production of BiOI Qds and wide-open a new perspective for BiOI applications.

Numerous modifications and variations of the present disclosure are possible in light of the above teachings. It is therefore to be understood that within the scope of the appended claims, the invention may be practiced otherwise than as specifically described herein.

The invention claimed is:

1. A method of making bismuth oxyhalide quantum dots, comprising:
    forming a first solution by dissolving a bismuth salt in an organic solvent selected from the group consisting of polyethylene glycol, methylene glycol, tri-ethylene glycol, and ethylene glycol;
    forming a second solution by dissolving an alkali metal salt in water;
    combining the first solution and the second solution to obtain a dual mixture;
    combining the dual mixture with an aqueous surfactant solution comprising a surfactant to obtain a final mixture comprising the bismuth oxyhalide quantum dots, wherein the surfactant is a polyoxyethylene glycol sorbitan alkyl ester; and
    filtering the final solution to obtain the bismuth oxyhalide quantum dots,
    wherein the alkali metal salt is selected from the group consisting of LiI, NaI, KI, CsI, LiBr, NaBr, KBr, CsBr, LiCl, NaCl, KCl, and CsCl, and
    wherein the method is carried out without added heat.

2. The method of claim 1, wherein the bismuth salt is $Bi(NO_3)_3$, and wherein the first solution, the second solution, the dual mixture and the final mixture are maintained at a temperature of ±5° C. during the forming and the combining.

3. The method of claim 1, wherein the dual mixture is added to the surfactant solution such that the ratio of dual mixture to surfactant solution is 1:4 wt %.

4. The method of claim 1, wherein the surfactant is selected from the group consisting of a polyoxyethylene sorbitan monolaurate and a polyoxyethylene sorbitan monooleate.

5. The method of claim 1, wherein the dual mixture is stirred for 5 to 10 minutes at a temperature of 15 to 25° C.

6. The method of claim 1, wherein the final mixture is stirred for 10 to 15 minutes at a temperature of 15 to 25° C.

7. The method of claim 1, wherein the final solution is filtered by a vacuum.

8. The method of claim 1, wherein the bismuth quantum dots are dried for 2 to 4 hours at a temperature of 100 to 115° C.

9. The method of claim 1, wherein the surfactant in the final mixture is present in an amount between 0.5 to 2.2 wt %.

10. The method of claim 1, wherein the alkali metal salt is KI.

11. The method of claim 1, wherein the bismuth oxyhalide quantum dots have a surface area of 59 to 82 m²/g.

12. The method of claim 1, wherein the bismuth oxyhalide quantum dots have a band gap energy ($E_g$) of 1.80 to 2 eV.

13. The method of claim 1, wherein the organic solvent is ethylene glycol.

14. The method of claim 1, wherein the bismuth oxyhalide quantum dots have a Bi:I molar ratio of 1:1.

* * * * *